United States Patent
Vignau

(10) Patent No.: US 12,050,772 B2
(45) Date of Patent: Jul. 30, 2024

(54) EYEWEAR DEVICE USER INTERFACE

(71) Applicant: Mathieu Emmanuel Vignau, Los Angeles, CA (US)

(72) Inventor: Mathieu Emmanuel Vignau, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/238,959

(22) Filed: Aug. 28, 2023

(65) Prior Publication Data

US 2023/0400978 A1 Dec. 14, 2023

Related U.S. Application Data

(63) Continuation of application No. 17/001,893, filed on Aug. 25, 2020, now Pat. No. 11,775,168.

(60) Provisional application No. 62/905,891, filed on Sep. 25, 2019.

(51) Int. Cl.
| G06F 3/04883 | (2022.01) |
| G06F 3/04815 | (2022.01) |
| G06F 3/0482 | (2013.01) |
| G06F 3/04845 | (2022.01) |
| G06F 3/038 | (2013.01) |

(52) U.S. Cl.
CPC ...... G06F 3/04883 (2013.01); G06F 3/04815 (2013.01); G06F 3/0482 (2013.01); G06F 3/04845 (2013.01); G06F 3/038 (2013.01); G06F 2203/0384 (2013.01)

(58) Field of Classification Search
CPC ............. G06F 3/04883; G06F 3/04845; G06F 3/04815; G06F 3/0482; G06F 3/038; G06F 2203/0384
See application file for complete search history.

(56) References Cited

U.S. PATENT DOCUMENTS

| 10,962,809 | B1 | 3/2021 | Castañeda |
| 10,976,901 | B1 | 4/2021 | Sukumaran |
| 2017/0364599 | A1 | 12/2017 | Ohanyerenwa et al. |
| 2018/0088678 | A1 | 3/2018 | Komaki et al. |
| 2019/0369569 | A1 | 12/2019 | Olsen et al. |
| 2020/0150435 | A1 | 5/2020 | Rodriguez |

*Primary Examiner* — Andrey Belousov
(74) *Attorney, Agent, or Firm* — Culhane PLLC; Stephen J. Weed

(57) ABSTRACT

Methods and system for creating and using graphical user interfaces (GUIs) for eyewear devices and eyewear devices including GUIs. The eyewear devices detect finger touches on a surface of the eyewear device and present GUIs on image displays of the eyewear device that are responsive to the finger touches.

20 Claims, 24 Drawing Sheets

EYEWEAR DEVICE USER INTERFACE

CROSS-REFERENCE TO RELATED APPLICATIONS

This application is a Continuation of U.S. application Ser. No. 17/001,893 filed on Aug. 25, 2020, and claims priority to U.S. Provisional Application Ser. No. 62/905,891 filed on Sep. 25, 2019, the contents of which are incorporated fully herein by reference.

TECHNICAL FIELD

The present subject matter relates to electronic devices and, more particularly, to a user interface for use with eyewear devices.

BACKGROUND

Computing devices, such as wearable devices, including portable eyewear devices (e.g., smartglasses, headwear, and headgear), necklaces, and smartwatches and mobile devices (e.g., tablets, smartphones, and laptops) integrate image displays and cameras. Graphical user interfaces (GUIs) are used to interact with content displayed on computing devices.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

The present disclosure describes GUIs for use with eyewear devices. In one example, the GUI is implemented as a cross (up/down/left/right) with one or more contextual menus that are always available when the user needs them, that contain clear call-to-action menu items, and that provide visual feedback when an action is taken. The contextual menu items may be designed to be memorizable in order to allow a user to take fast action.

The description that follows includes systems, methods, techniques, instruction sequences, and computing machine program products for implementing a graphical user interface (GUI) illustrative of examples of the disclosure. In the following description, for the purposes of explanation, numerous specific details are set forth in order to provide an understanding of various examples of the disclosed subject matter. It will be evident, however, to those skilled in the art, that examples of the disclosed subject matter may be practiced without these specific details. In general, well-known instruction instances, protocols, structures, and techniques are not necessarily shown in detail.

Figure 1A:
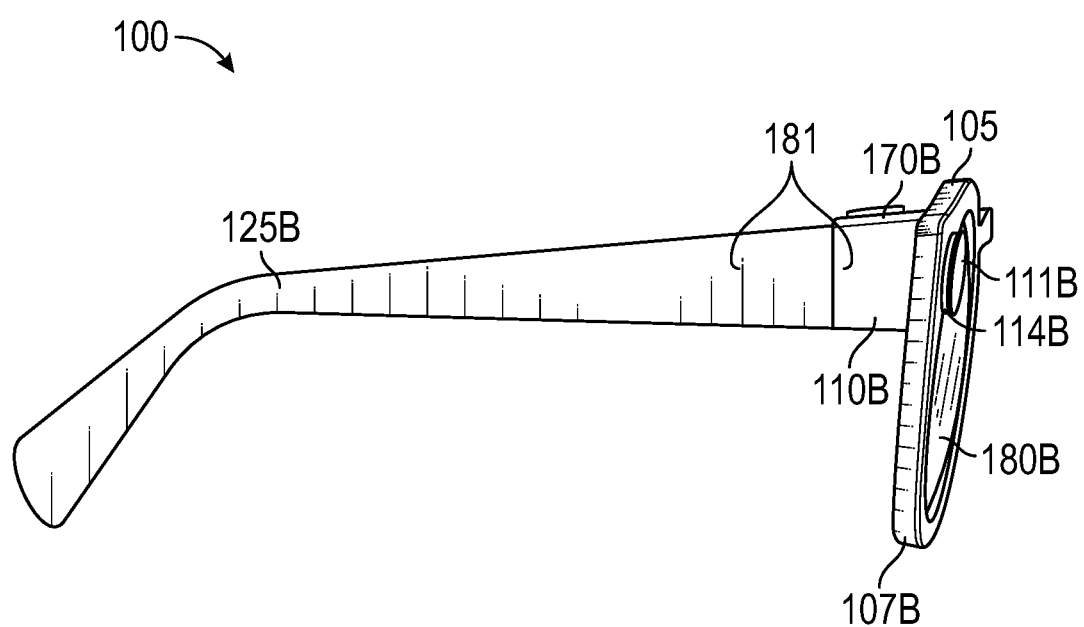
FIG. 1A is a right side view of a hardware configuration of an eyewear device, which includes an input surface for interacting with a graphical user interface (GUI).

FIG. 1A is a right side view of an example hardware configuration of an eyewear device 100, which includes a touch sensitive input surface 181. Eyewear device 100 includes a right optical assembly 180B with an image display to present images. As shown in FIG. 1A, the eyewear device 100 includes the right visible light camera 114B. Eyewear device 100 can include multiple visible light cameras 114A-B that form a passive type of depth-capturing camera, such as a stereo camera, of which the right visible light camera 114B is located on a right side (e.g., in a right chunk 110B). The eyewear device 100 can also include a left visible light camera 114A on a left side (e.g., in a left chunk 110A). The depth-capturing camera(s) can be an active type of depth-capturing camera that includes a single visible light camera 114B and a depth sensor (e.g., an infrared camera and an infrared emitter).

Left and right visible light cameras 114A-B are sensitive to the visible light range wavelength. Each of the visible light cameras 114A-B have a different frontward facing field of view which are overlapping to allow three-dimensional depth images to be generated, for example, right visible light camera 114B has the depicted right field of view 111B. Generally, a "field of view" is the part of the scene that is visible through the camera at a particular position and orientation in space. Objects or object features outside the field of view 111A-B when the image is captured by the visible light camera are not recorded in a raw image (e.g., photograph or picture). The field of view describes an angle range or extent in which the image sensor of the visible light camera 114A-B picks up electromagnetic radiation of a given scene in a captured image of the given scene. Field of view can be expressed as the angular size of the view cone, i.e., an angle of view. The angle of view can be measured horizontally, vertically, or diagonally.

In an example, visible light cameras 114A-B have a field of view with an angle of view between 15° to 30°, for example 24°, and have a resolution of 480×480 pixels. The "angle of coverage" describes the angle range that a lens of visible light cameras 114A-B or infrared camera can effectively image. Typically, the image circle produced by a camera lens is large enough to cover the film or sensor completely, possibly including some vignetting (e.g., a reduction of an image's brightness or saturation toward the periphery compared to the image center). If the angle of coverage of the camera lens does not fill the sensor, the image circle will be visible, typically with strong vignetting toward the edge, and the effective angle of view will be limited to the angle of coverage.

Examples of such visible lights camera 114A-B include a high-resolution complementary metal-oxide-semiconductor (CMOS) image sensor and a video graphic array (VGA) camera, such as 640p (e.g., 640×480 pixels for a total of 0.3 m 3egapixels), 720p, or 1080p. As used herein, the term "overlapping" when referring to field of view means the matrix of pixels in the generated raw image(s) or infrared image of a scene overlap by 30% or more. As used herein, the term "substantially overlapping" when referring to field of view means the matrix of pixels in the generated raw image(s) or infrared image of a scene overlap by 50% or more.

Image sensor data from the visible light cameras 114A-B are captured along with geolocation data, digitized by an image processor, and stored in a memory. The captured left and right raw images captured by respective visible light cameras 114A-B are in the two-dimensional space domain and comprise a matrix of pixels on a two-dimensional coordinate system that includes an X axis for horizontal position and a Y axis for vertical position. Each pixel includes a color attribute (e.g., a red pixel light value, a green pixel light value, and a blue pixel light value); and a position attribute (e.g., an X location coordinate and a Y location coordinate).

To provide stereoscopic vision, visible light cameras 114A-B may be coupled to an image processor (element 312 of FIG. 3) for digital processing along with a timestamp in which the image of the scene is captured. Image processor 312 includes circuitry to receive signals from the visible light cameras 114A-B and process those signals from the visible light camera 114 into a format suitable for storage in the memory. The timestamp can be added by the image processor or other processor, which controls operation of the visible light cameras 114A-B. Visible light cameras 114A-B allow the depth-capturing camera to simulate human binocular vision. Depth-capturing camera provides the ability to reproduce three-dimensional images based on two captured images from the visible light cameras 114A-B having the same timestamp. Such three-dimensional images allow for an immersive life-like experience, e.g., for virtual reality or video gaming.

For stereoscopic vision, a pair of raw red, green, and blue (RGB) images are captured of a scene at a given moment in time—one image for each of the left and right visible light cameras 114A-B. When the pair of captured raw images from the frontward facing left and right field of views 111A-B of the left and right visible light cameras 114A-B are processed (e.g., by the image processor 312 of FIG. 3), depth images are generated, and the generated depth images can be perceived by a user on the optical assembly 180A-B or other image display(s) (e.g., of a mobile device). The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex includes a color attribute (e.g., a red pixel light value, a green pixel light value, and a blue pixel light value); a position attribute (e.g., an X location coordinate, a Y location coordinate, and a Z location coordinate); a texture attribute, a reflectance attribute, or any combination thereof. The texture attribute quantifies the perceived texture of the depth image, such as the spatial arrangement of color or intensities in a region of vertices of the depth image.

Figure 1B:
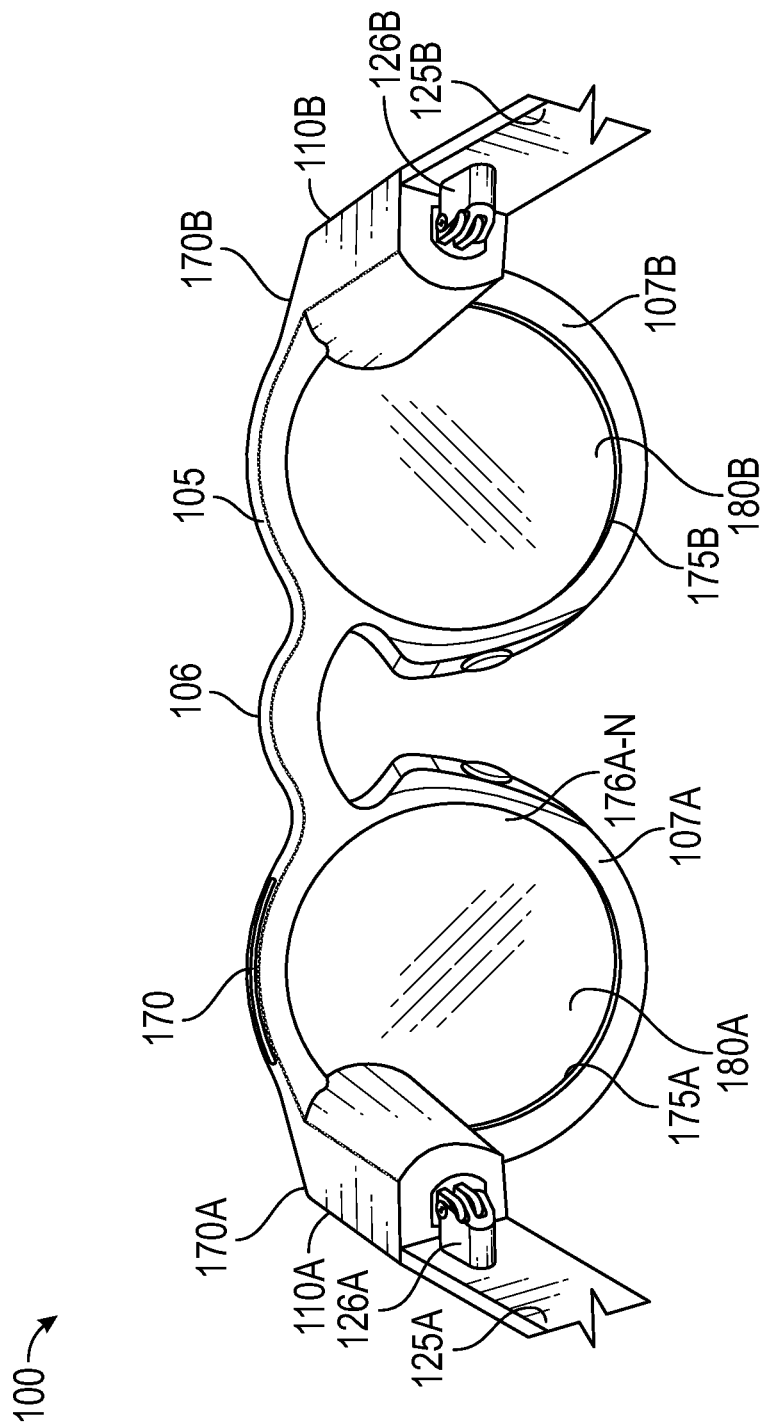
FIGS. 1B and 1C are rear views of hardware configurations of the eyewear device, including two different types of image displays.
Figure 1C:
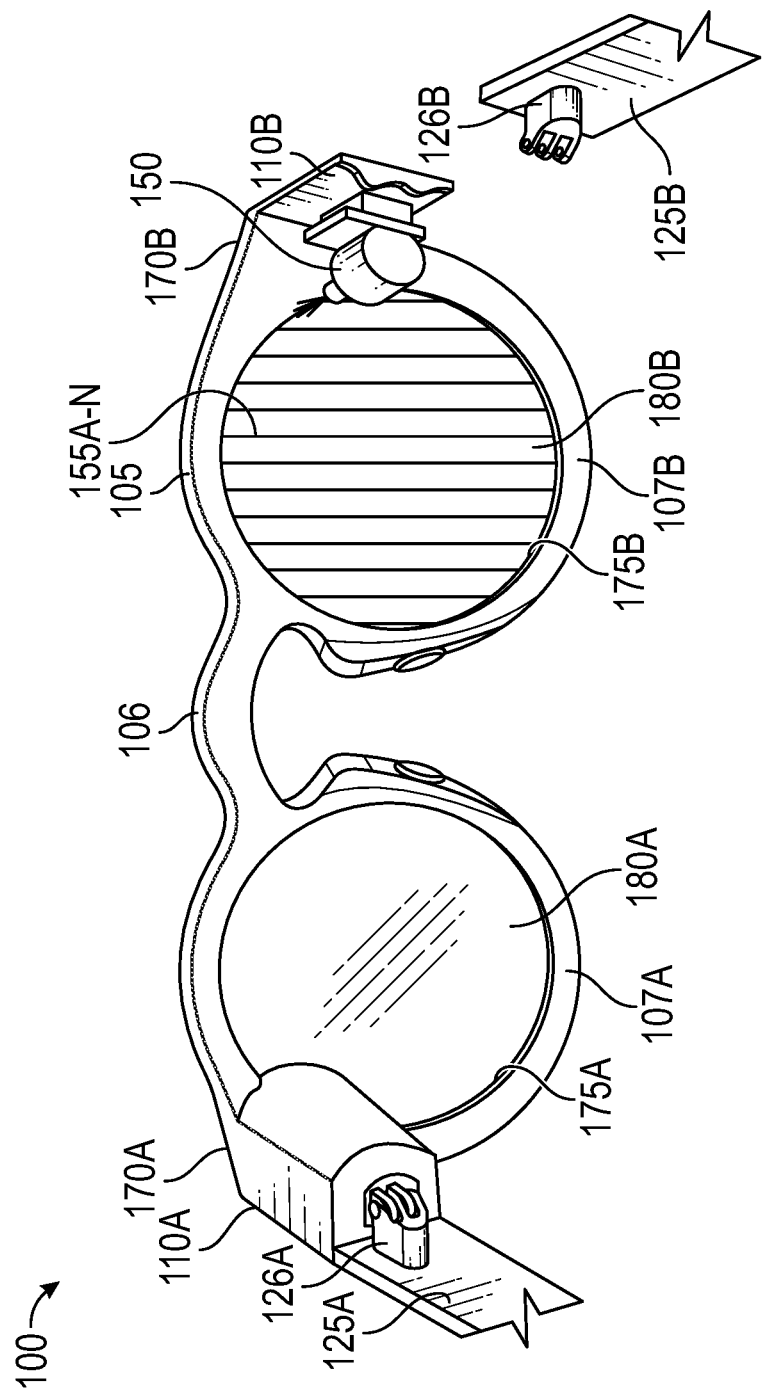

FIGS. 1B-C are rear views of example hardware configurations of the eyewear device 100, including two different types of image displays. Eyewear device 100 is in a form configured for wearing by a user, which are eyeglasses in the example. The eyewear device 100 can take other forms and may incorporate other types of frameworks, for example, a headgear, a headset, or a helmet.

In the eyeglasses example, eyewear device 100 includes a frame 105 including a left rim 107A connected to a right rim 107B via a bridge 106 adapted for a nose of the user. The left and right rims 107A-B include respective apertures 175A-B which hold a respective optical element 180A-B, such as a lens and a display device. As used herein, the term lens is meant to cover transparent or translucent pieces of glass or plastic having curved or flat surfaces that cause light to converge/diverge or that cause little or no convergence or divergence.

Although shown as having two optical elements 180A-B, the eyewear device 100 can include other arrangements, such as a single optical element depending on the application or intended user of the eyewear device 100. As further shown, eyewear device 100 includes a left chunk 110A adjacent the left lateral side 170A of the frame 105 and a right chunk 110B adjacent the right lateral side 170B of the frame 105. The chunks 110A-B may be integrated into the frame 105 on the respective lateral sides 170A-B (as illustrated) or implemented as separate components attached to the frame 105 on the respective sides 170A-B. Alternatively, the chunks 110A-B may be integrated into temples (not shown) attached to the frame 105.

As shown in FIG. 1B, the optical assembly 180A-B includes a suitable display matrix 170, e.g., a liquid crystal display (LCD), an organic light-emitting diode (OLED) display, or other such display. The optical assembly 180A-B also includes an optical layer or layers 176, which can include lenses, optical coatings, prisms, mirrors, waveguides, optical strips, and other optical components in any combination. The optical layers 176A-N can include a prism having a suitable size and configuration and including a first surface for receiving light from display matrix and a second surface for emitting light to the eye of the user.

The prism of the optical layers 176A-N extends over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism is sized and shaped so that the light is refracted within the prism and is directed towards the eye of the user by the second surface of the prism of the optical layers 176A-N. In this regard, the second surface of the prism of the optical layers 176A-N can be convex to direct the light towards the center of the eye. The prism can optionally be sized and shaped to magnify the image projected by the display matrix 170, and the light travels through the prism so that the image viewed from the second surface is larger in one or more dimensions than the image emitted from the display matrix 170.

In another example, the image display device of optical assembly 180A-B includes a projection image display as shown in FIG. 1C. The optical assembly 180A-B includes a laser projector 150, which is a three-color laser projector using a scanning mirror or galvanometer. During operation, an optical source such as a laser projector 150 is disposed in or on one of the temples 125A-B of the eyewear device 100. Optical assembly 180A-B includes one or more optical strips 155A-N spaced apart across the width of the lens of the optical assembly 180A-B or across a depth of the lens between the front surface and the rear surface of the lens.

As the photons projected by the laser projector 150 travel across the lens of the optical assembly 180A-B, the photons encounter the optical strips 155A-N. When a particular photon encounters a particular optical strip, the photon is either redirected towards the user's eye, or it passes to the next optical strip. A combination of modulation of the laser projector 150, and modulation of the optical strips, control specific photons or beams of light. In an example, a processor controls optical strips 155A-N by initiating mechanical, acoustic, or electromagnetic signals. Although shown as having two optical assemblies 180A-B, the eyewear device 100 can include other arrangements, such as a single or three optical assemblies, or the optical assembly 180A-B may have different arrangements depending on the application or intended user of the eyewear device 100.

In one example, the image display includes a first (left) image display and a second (right) image display. Eyewear device 100 includes first and second apertures 175A-B which hold a respective first and second optical assembly 180A-B. The first optical assembly 180A includes the first image display (e.g., a display matrix 170A of FIG. 1B; or optical strips 155A-N' and a projector 150A of FIG. 1C). The second optical assembly 180B includes the second image display e.g., a display matrix 170B of FIG. 1B; or optical strips 155A-N" and a projector 150B of FIG. 1C).

Figure 1D:
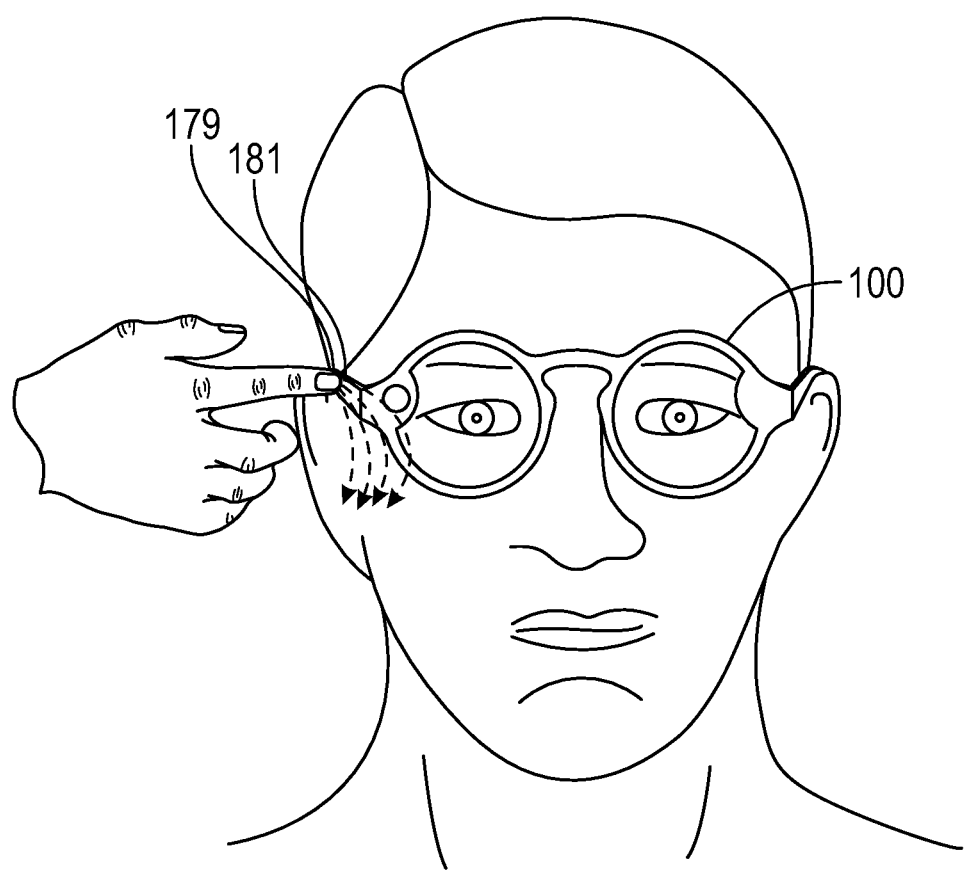
FIG. 1D depicts a schematic view of operation for interaction with the GUI using the input surface of the eyewear.

FIG. 1D depicts a schematic view of the eyewear device 100 including an input surface 181 on the right hand side for receiving finger taps and gestures from at least one finger contact 179 inputted from a user. A similar input surface may be present on the left hand side. The input surface 181 is configured to detect finger touch/taps and gestures (e.g., motion) for use with a GUI displayed by the eyewear display to navigate through and select menu options in an intuitive manner, which enhances and simplifies the user experience.

Detection of finger taps/gestures via the input surface(s) 181 can enable several functions. For example, touching anywhere on the input surface 181 may cause the GUI to display or highlight an item on the screen of the image display of the optical assembly 180A-B. Double tapping on the input surface 181 may select an item. Sliding (e.g., swiping) a finger in one direction, e.g., from front to back, back to front, up to down, or down to up may slide or scroll in one direction, for example, to move to a previous video, image, page, or slide. Sliding the finger in another the other may slide or scroll in the opposite direction, for example, to move to a previous video, image, page, or slide. The input surface(s) 181 can be virtually anywhere on the eyewear device 100.

In one example, when the identified finger gesture is a single tap on the input surface 181, this initiates selection or pressing of a graphical user interface element in the image presented on the image display of the optical assembly 180A-B. An adjustment to the image presented on the image display of the optical assembly 180A-B based on the identified finger gesture can be a primary action which selects or submits the graphical user interface element on the image display of the optical assembly 180A-B for further display or execution.

Eyewear device 100 may include wireless network transceivers, for example cellular or local area network transceivers (e.g., WiFi or Bluetooth™), and run applications (also known as apps). Some of the applications may include a web browser to navigate the Internet, an application to place phone calls, video or image codecs to watch videos or interact with pictures, codecs to listen to music, a turn-by-turn navigation application (e.g., to enter in a destination address and view maps), an augmented reality application, and an email application (e.g., to read and compose emails). Gestures inputted on the input surface 181 can be used to manipulate and interact with the displayed content on the image display and control the applications.

Execution of the programming (element 345 of FIG. 3) by the processor (element 332 of FIG. 3) further configures the eyewear device 100 to identify a finger gesture on the input surface 181 of the eyewear device 100 by detecting at least one detected touch event based on variation of the tracked movement of the eyewear device 100 over a time period. Execution of the programming (element 345 of FIG. 3) by the processor (element 332 of FIG. 3) further configures the eyewear device 100 to adjust the image presented on the image display of the optical assembly 180A-B of the eyewear device 100 based on the identified finger gesture.

Figure 1E:
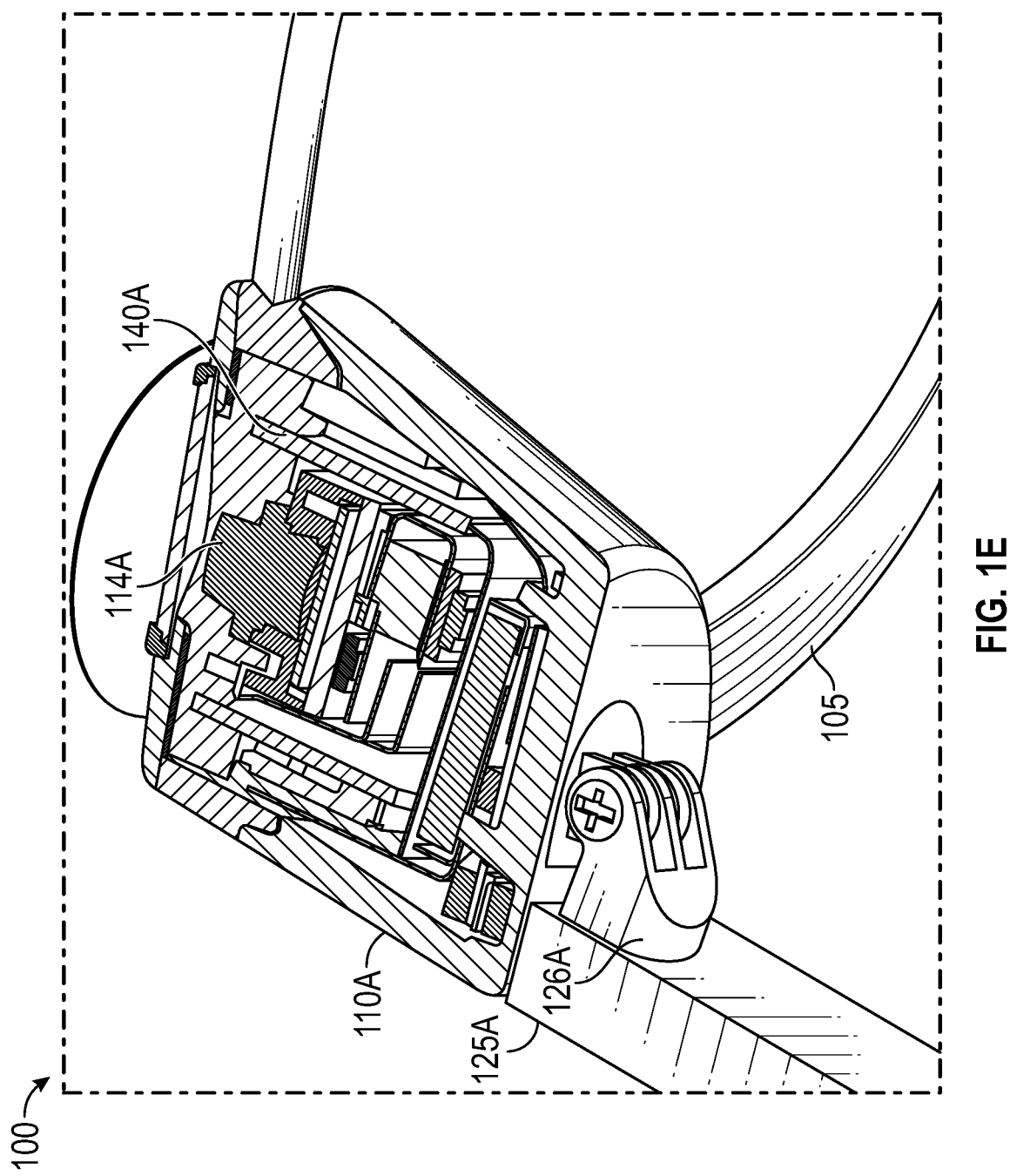
FIG. 1E is a top cross-sectional view of a left chunk of the eyewear device of FIGS. 1B and 1C depicting the input tracker and a circuit board.

FIG. 1E is a top cross-sectional view of a left chunk 110A of the eyewear device 100 of FIGS. 1B and 1C depicting a circuit board 140A. In the example, the left chunk 110A includes a flexible printed circuit board 140A. The left chunk 110A may be integrated into or connected to the frame 105 on the left lateral side 170A. In some examples, the right chunk 110B includes one or more components similar to component(s) in the left chunk 110A.

Figure 2C:
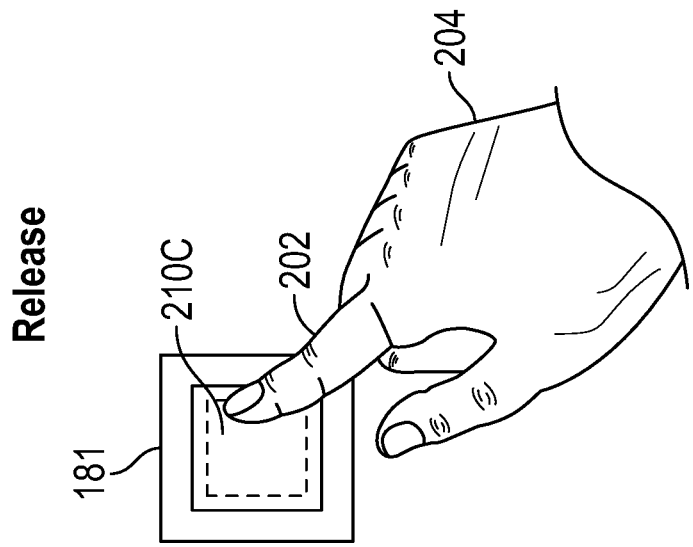
FIGS. 2A, 2B, and 2C depict a schematic view of operation illustrating a press (FIG. 2A), a hold (FIG. 2B), and a release (FIG. 2C) performed on the input surface.
Figure 2B:
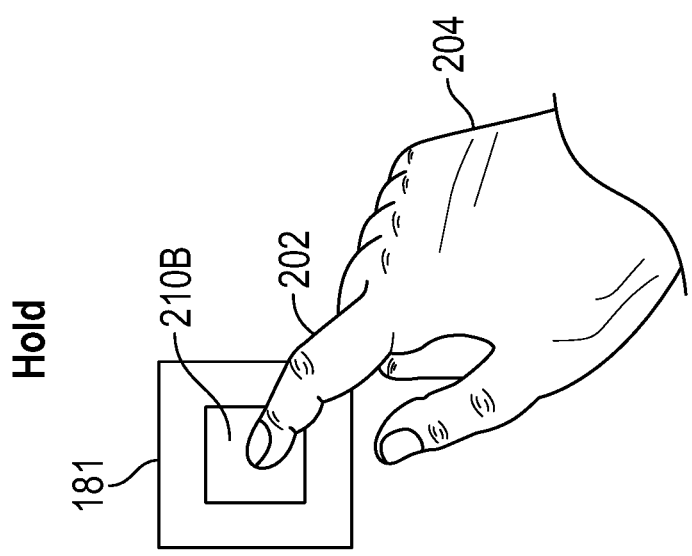
Figure 2A:
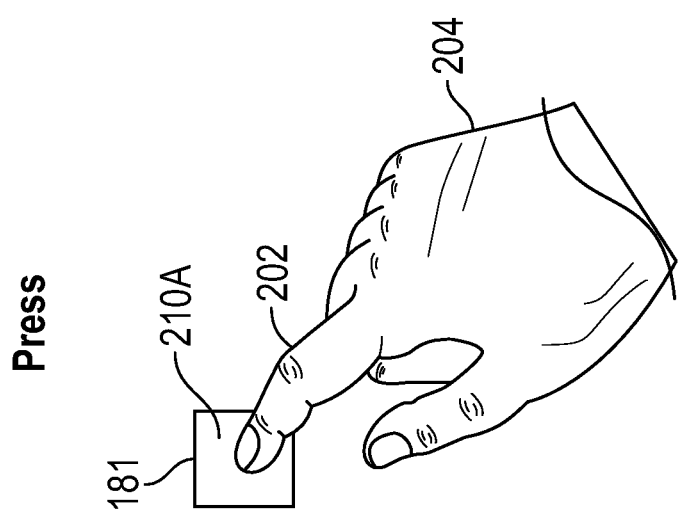

FIGS. 2A, 2B, and 2C depict a schematic view of operation illustrating a press (FIG. 2A), a hold (FIG. 2B), and a release (FIG. 2C) performed on an input surface 181 of the eyewear device 100. FIG. 2A illustrates the finger 202 of a user's hand 204 contacting the input surface 181 in a finger contact area 210A. FIG. 2B illustrates identification of the finger 202 in a more precise finger contact area 210B on the input surface 181. FIG. 2C illustrates a release of the finger 202 from the input surface 181 from the finger contact area 210C.

Figure 2D:
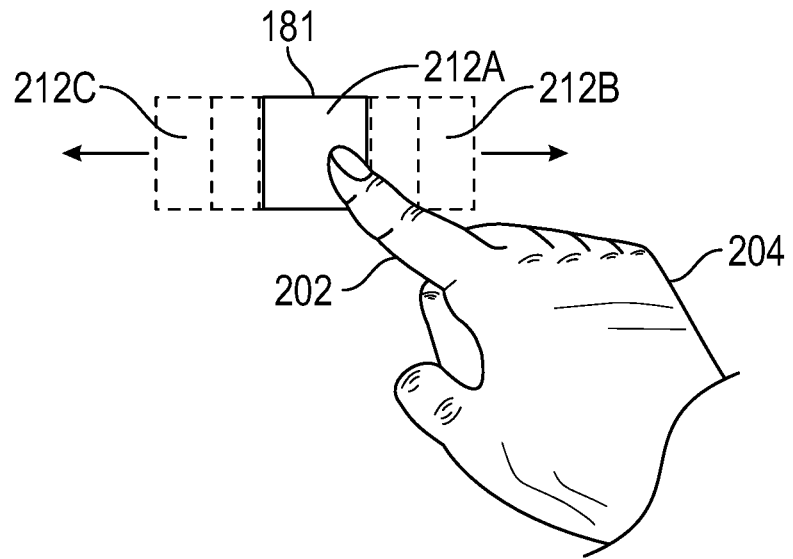
FIG. 2D depict a schematic view of operation illustrating a swipe left and a swipe right performed on the input surface.
Figure 2E:
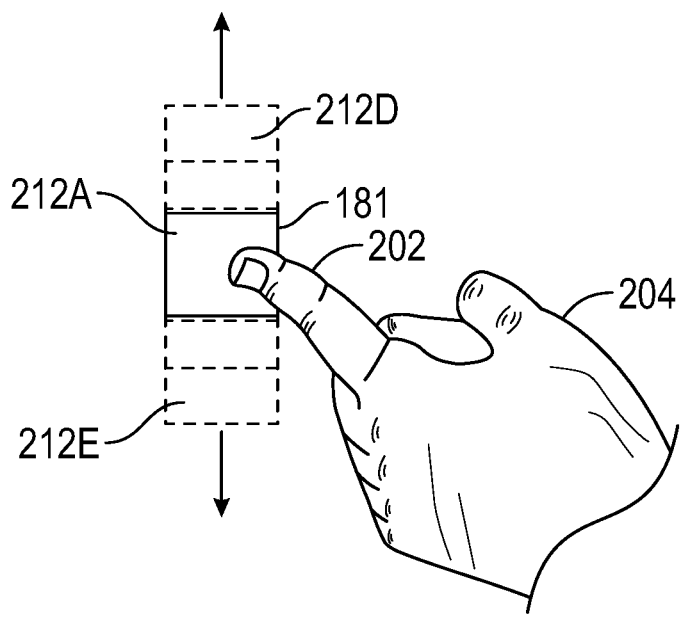
FIG. 2E depict a schematic view of operation illustrating a swipe up and a swipe down performed on the input surface.

FIGS. 2D and 2E illustrate a finger 202 contacting an input surface 181 and swiping right, left, up, and down. In FIG. 2D, the finger 202 contacts the input surface 181 at an initial point of contact 212A. Sliding the finger 202 to the right/forward toward a right/forward point of contact 212B is associated with a first action and sliding the finger to the left/backward toward a left/backward point of contact 212C is associated with a second action. In FIG. 2E, the finger 202 contacts the input surface 181 at the initial point of contact 212A. Sliding the finger 202 up toward an upper point of contact 212D is associated with a third action and sliding the finger down toward a lower point of contact 212E is associated with a fourth action. Additionally, tapping the input surface 181 is associated with a fifth action.

Figure 2F:
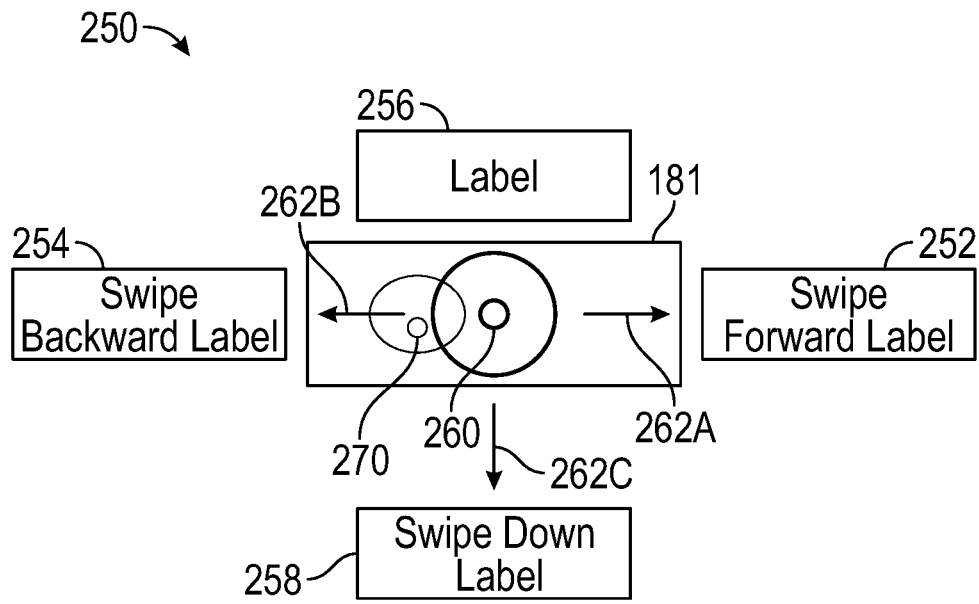
FIGS. 2F and 2G illustrate visual aspects of an example GUI.
Figure 2G:
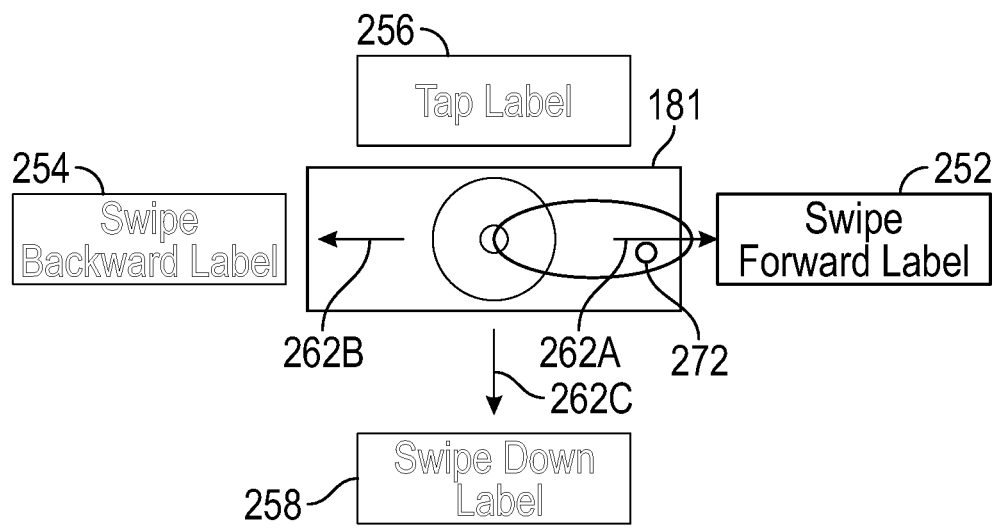

FIGS. 2F and 2G illustrates a GUI menu template 250. The template 250 includes a swipe forward label 252, a swipe backward label 254, a tap label 256, and a swipe down label 258. Additionally, the template may include a label associated with a swipe up. Each label may be associated with a word or symbol corresponding to a menu action (e.g., send, store, etc.). The template may also include directional arrows 262A-C indicating finger movement and a bullseye 260 indicating a tap needed to perform a particular menu action.

FIG. 2F illustrates a user finger position 270 on the input surface 181. While the user's finger is within the bullseye region 260, all actions available through the GUI are available for selection as indicated by all labels and arrows being in a uniform font, color, or brightness. As the user's finger is slid out of the bullseye region 260 toward one of the available directions, the action for selection (and its corresponding arrow) is emphasized (e.g., it is emphasized or the other actions are deemphasized/greyed out/removed) with respect to the other actions/arrows (e.g., swiping right/forward in FIG. 2G to finger position 272). Releasing the finger 202 from the input surface 210 when the action for selection is emphasized results in selection of that action. Moving the finger 202 back toward the bullseye region 260 without release will not result in a selection and all actions will again be available for selection.

Figure 2H:
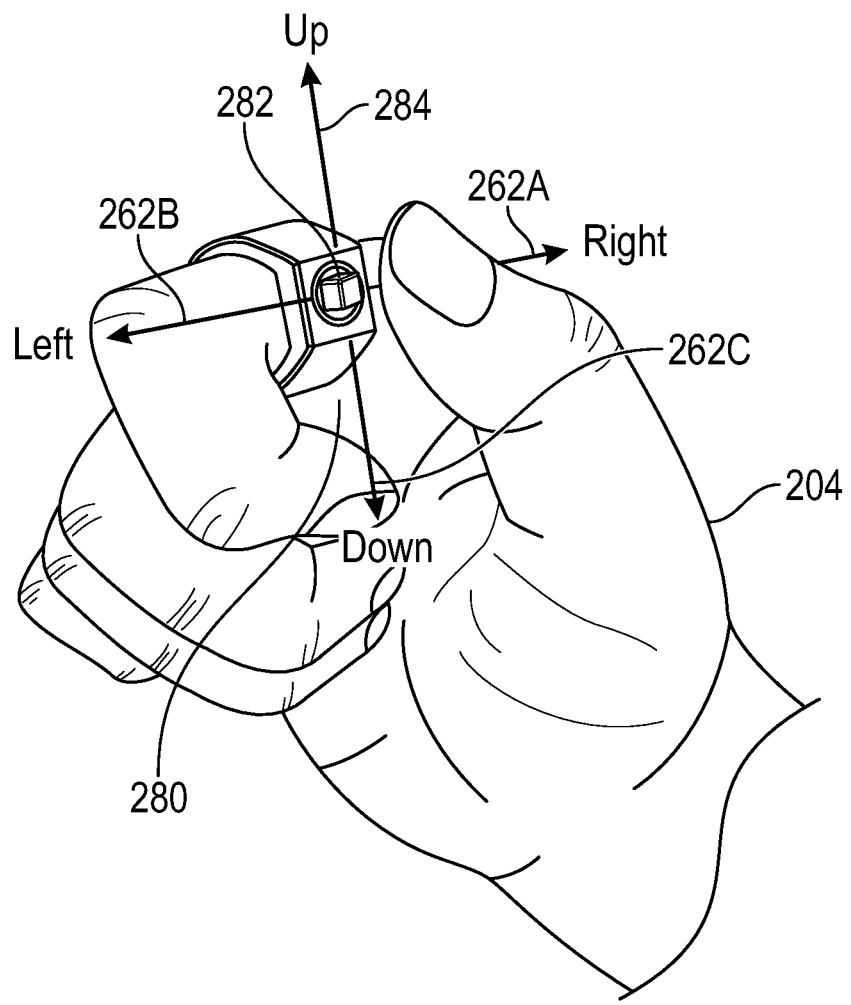
FIG. 2H is a schematic view of a remote accessory for controlling a GUI presented on an eyewear device.

FIG. 2H depicts a remote accessory 280 embodied as a ring. The remote accessory includes an input device such as an input surface similar to input surface 181 or a joystick 282 as illustrated. A user may actuate the joystick to perform operations associated with the GUI. Right and left movement of the joystick 282 is associated with forward and backward actions on the input surface 181, downward movement is associated with a down action, and depressing the joystick 282 is associated with a tap. A selection may be made using the remote accessory 280 through a quick press or by moving the joystick in the direction 284 associated with the desired action followed by a quick release. The GUI and associated actions available when the remote accessory is in use may be different that the GUI and associated actions available when using the input surface 181.

Figure 3:
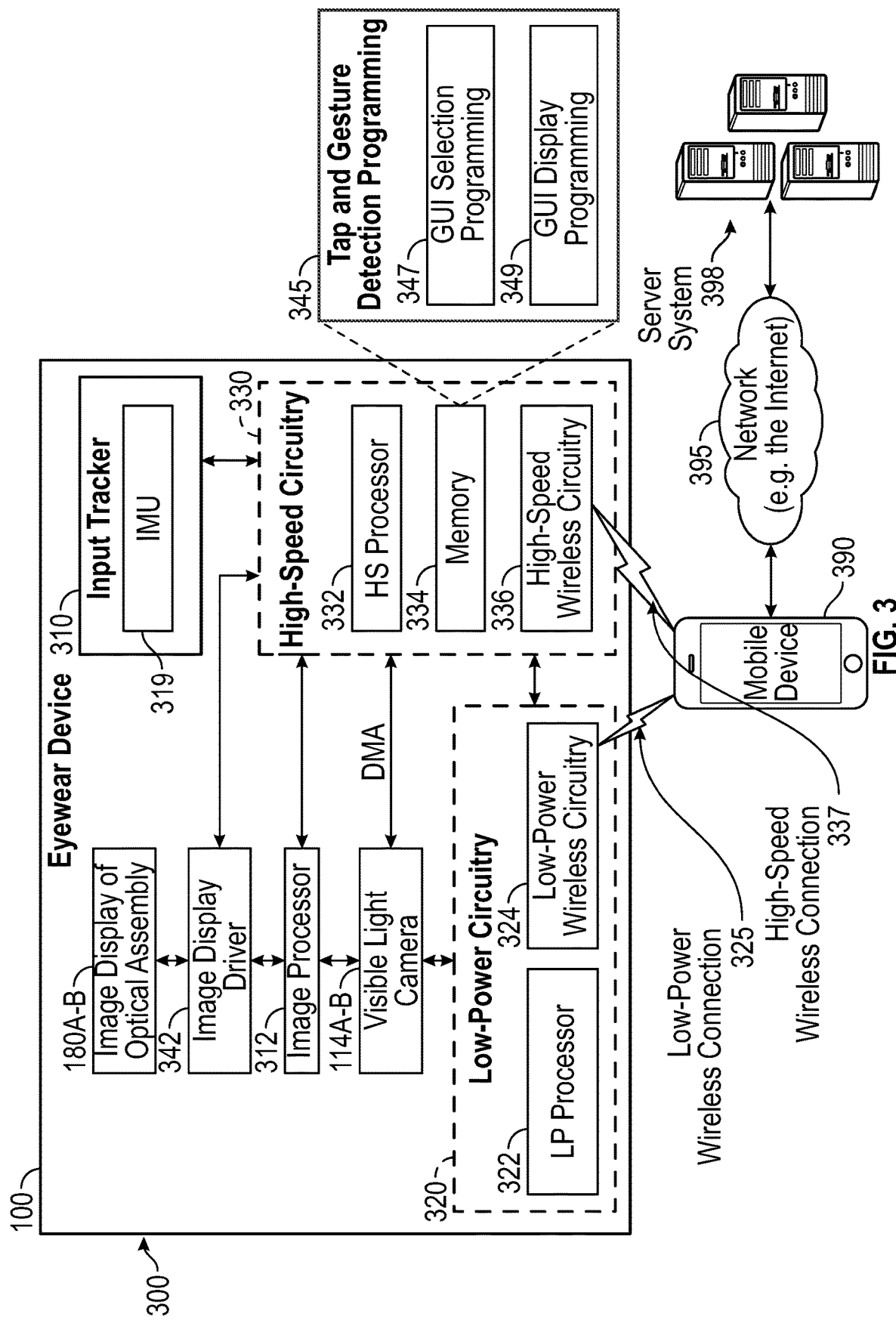
FIG. 3 is a high-level functional block diagram of components of the eyewear device with an input tracker to identify finger touches and gestures along with a mobile device and a server system connected via various networks.

FIG. 3 depicts an eyewear system 300 for implementing GUIs as described herein in an eyewear device 100. The system includes the eyewear device 100, a mobile device 390, and a host computer, such as a server system 398. The host computer may be a personal computer, embedded high speed processor, GPU, FPGA or other processing system. Server system 398 may be one or more computing devices as part of a service or network computing system, for example, that include a processor, a memory, and network communication interface to communicate over a network 395 (e.g., the Internet) with the mobile device 390 and eyewear device 100. It is not required for the server system 398 to communicate with the mobile device 390 or the eyewear device 100.

Finger tap and gesture detection programming 345, GUI selection programming 347, and GUI display programming 349 are stored for execution by eyewear device 100. Although shown in the memory 334 of the high-speed circuitry 330, one or more of the programming instructions can be stored and executed in the low power processor 322.

The eyewear system additionally includes an input tracker 310 receiving input from the input surface 181 to identify finger taps and gestures, a mobile device 390, and a server system 398 connected via various networks. Eyewear device 100 is connected with a host computer. For example, the eyewear device 100 is paired with the mobile device 390 via the high-speed wireless connection 337 or connected to the server system 398 via the network 395.

The mobile device 390 may be a smartphone, tablet, laptop computer, access point, or any other such device capable of connecting with eyewear device 100 using both a low-power wireless connection 325 and a high-speed wireless connection 337. Mobile device 390 is connected to server system 398 and network 395. The network 395 may include any combination of wired and wireless connections.

Eyewear device 100 includes the input tracker 310 including inertia measuring unit 319 and a depth-capturing camera, such as at least one of the visible light cameras 114A-B. Eyewear device 100 further includes two image displays of the optical assembly 180A-B (one associated with the left lateral side 170A and one associated with the right lateral side 170B). Eyewear device 100 also includes image display driver 342, image processor 312, low-power circuitry 320, and high-speed circuitry 330. Image display of optical assembly 180A-B is for presenting images and videos, which can include a sequence of images. Image display driver 342 is coupled to the image display of optical assembly 180A-B to control the image display of optical assembly 180A-B to present the images. The components shown in FIG. 3 for the eyewear device 100 are located on one or more circuit boards, for example a PCB or flexible PCB, in the rims 107A-B or temples 125A-B. Alternatively, or additionally, the depicted components can be located in the chunks 110A-B, frame 105, hinges 126A-B, or bridge 106 of the eyewear device 100.

As shown, memory 334 further includes tap and gesture detection programming 345 to perform a subset or all of the functions described herein for gesture detection, including GUI selection programming 347 to perform a subset or all of the functions described herein for selecting GUIs, and GUI display programming 349 to perform a subset or all of the functions described herein for displaying GUIs.

High-speed circuitry 330 includes high-speed processor 332, memory 334, and high-speed wireless circuitry 336. In the example, the image display driver 342 is coupled to the high-speed circuitry 330 and is operated by the high-speed processor 332 in order to drive the left and right image displays of the optical assembly 180A-B. High-speed processor 332 may be any processor capable of managing high-speed communications and operation of any general computing system needed for eyewear device 100. High-speed processor 332 includes processing resources needed for managing high-speed data transfers on high-speed wireless connection 337 to a wireless local area network (WLAN) using high-speed wireless circuitry 336.

The high-speed processor 332 may execute firmware that includes the gesture detection programming 345, including GUI selection programming 347, GUI display programming 349, and an operating system, such as a LINUX operating system or other such operating system of the eyewear device 100 and the operating system is stored in memory 334 for execution. In addition to any other responsibilities, the high-speed processor 332 executing a software architecture for the eyewear device 100 manages data transfers with high-speed wireless circuitry 336. In some examples, high-speed wireless circuitry 336 implements Institute of Electrical and Electronic Engineers (IEEE) 802.11 communication standards, also referred to herein as Wi-Fi. In other examples, the high-speed wireless circuitry 336 implements other high-speed communication standards.

Low-power wireless circuitry 324 and the high-speed wireless circuitry 336 of the eyewear device 100 can include short range transceivers (Bluetooth™) and wireless wide, local, or wide area network transceivers (e.g., cellular or WiFi). Mobile device 390, including the transceivers communicating via the low-power wireless connection 325 and high-speed wireless connection 337, may be implemented using details of the architecture of the eyewear device 100, as can other elements of network 395.

Memory 334 includes any storage device capable of storing various data and applications, including, among other things, programming instructions, camera data generated by the left and right visible light cameras 114A-B, and the image processor 312, as well as images and videos generated for display by the image display driver 342 on the image displays of the optical assembly 180A-B. While memory 334 is shown as integrated with high-speed circuitry 330, in other examples, memory 334 may be an independent standalone element of the eyewear device 100. In certain such examples, electrical routing lines may provide a connection through a chip that includes the high-speed processor 332 from the image processor 312 or low-power processor 322 to the memory 334. In other examples, the high-speed processor 332 may manage addressing of memory 334 such that the low-power processor 322 will boot the high-speed processor 332 any time that a read or write operation involving memory 334 is needed.

The processor 332 of the eyewear device 100 is coupled to the input tracker 310, the depth-capturing camera (visible light cameras 114A-B; or visible light camera 114A and a depth sensor, which is not shown), the image display driver 342, and the memory 334. Eyewear device 100 can perform all or a subset of any of the following functions described below as a result of the execution of the gesture detection programming 345, GUI selection programming 347, and GUI display programming 349 in the memory 334 by the processor 332 of the eyewear device 100.

Execution of the tap and gesture detection programming 345, GUI selection programming 347, and GUI display programming 349 by the processor 332 configures the eyewear device 100 to perform functions, including functions to track, via the input tracker 310, finger movement on the input surface 181 of the eyewear device 100 from the at least one finger contact 179 input by the user on the input surface 181. Eyewear device 100 identifies a finger gesture on the input surface 181 of the eyewear device by detecting at least one detected touch event based on variation of the tracked movement. Eyewear device 100 adjusts the GUI presented on the image display 180A-B of the eyewear device 100 based on the identified finger gestures and taps.

Output components of the eyewear device 100 include visual components, such as the left and right image displays of optical assembly 180A-B as described in FIGS. 1B-C (e.g., a display such as a liquid crystal display (LCD), a plasma display panel (PDP), a light emitting diode (LED) display, a projector, or a waveguide). Left and right image displays of optical assembly 180A-B can present images, such as in a video. The image displays of the optical assembly 180A-B are driven by the image display driver 342.

The output components of the eyewear device 100 further include acoustic components (e.g., speakers), haptic components (e.g., a vibratory motor), other signal generators, and so forth. The input components of the eyewear device 100, the mobile device 390, and server system 398, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Eyewear device 100 may optionally include additional peripheral device elements. Such peripheral device elements may include biometric sensors, additional sensors, or display elements integrated with eyewear device 100. Peripheral device elements may include any I/O components including output components, motion components, position components, or any other such elements described herein.

Figure 4A:
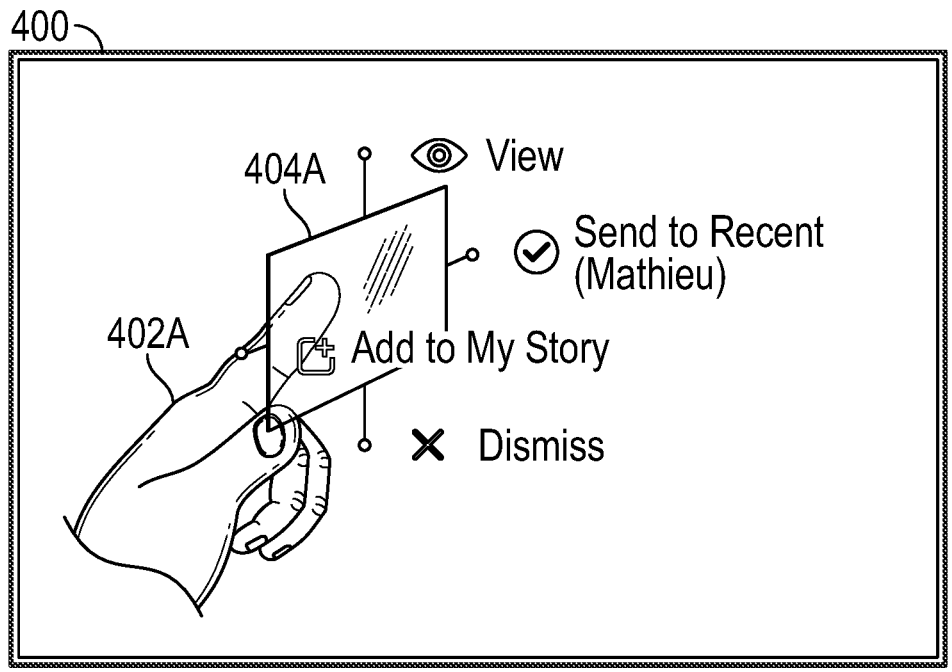
FIGS. 4A and 4B are an illustration and a schematic, respectively, showing a GUI for a left-hand interaction on a left side of the eyewear device.

FIG. 4A is an example GUI 400 presented on the display of the eyewear device 100 when a finger contacts an input surface on the left side of the eyewear device 100. The GUI 400 has a left hand perspective; and depicts a virtual pointer 402A (e.g., an image of a left hand with an index finger extended) and a virtual input surface 404A. The virtual pointer 402A corresponds to the finger on the input surface on the left side of the eyewear device 100, the virtual input surface 404A corresponds to the input surface on the left side of the eyewear device 100, and the relationship between the positional relationship of the virtual pointer 402A on the virtual input surface 404A corresponds the position of the finger on the input surface on the left side of the eyewear device 100. Although depicted as a 2D image, the GUI 400 may be presented on the display of the eyewear device 100 as a 3D image having depth perceived by the user wearing the eyewear device.

The available actions in the GUI 400 include an associated label having a symbol and text. Swiping up on the input surface on the left side and releasing (associated with an eye symbol and the text "View") results in an action to view an image on the eyewear device 100. Swiping down on the input surface on the left side and releasing (associated with an X symbol and the text "Dismiss") results in no action. Swiping forward/left on the input surface on the left side and releasing (associated with a checkmark in a circle symbol and the text "Send to Recent") results in an action to send an image to the same recipient that an immediately prior image was sent. Swiping backward/right on the input surface on the left side and releasing (associated with a square with a plus sign and the text "Add to My Story") results in an action to save an image to a particular area of a social media application.

Figure 4B:
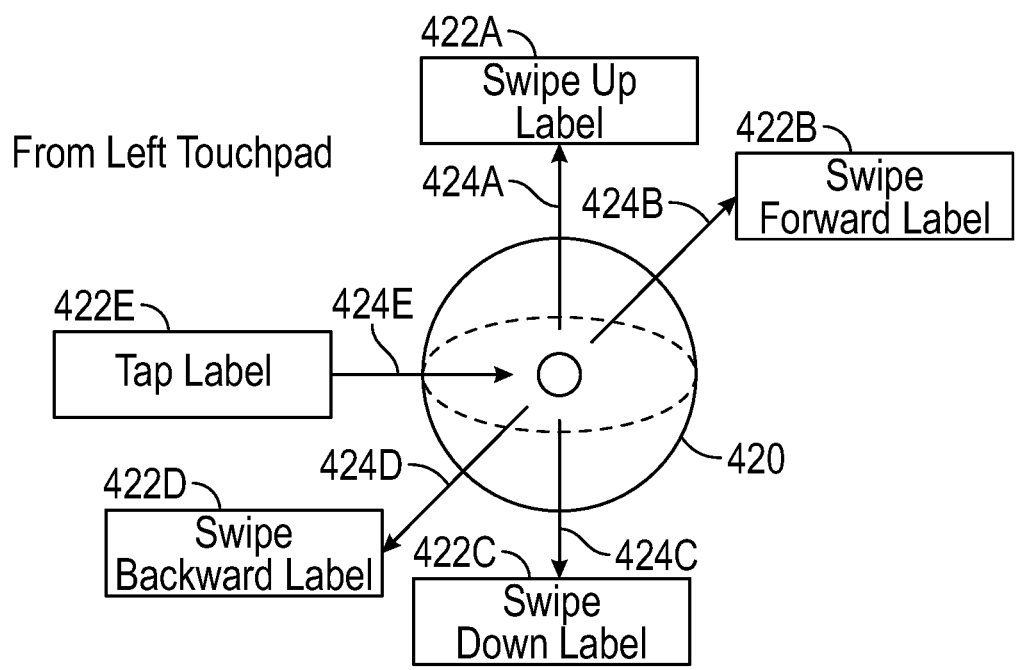

FIG. 4B depicts a template for setting up a left hand perspective GUI such as GUI 400. The template includes an orientation sphere 420. Additionally, the template includes a label 422A-E for each available tap/gesture and a corresponding directional arrow 424A-E.

Figure 4C:
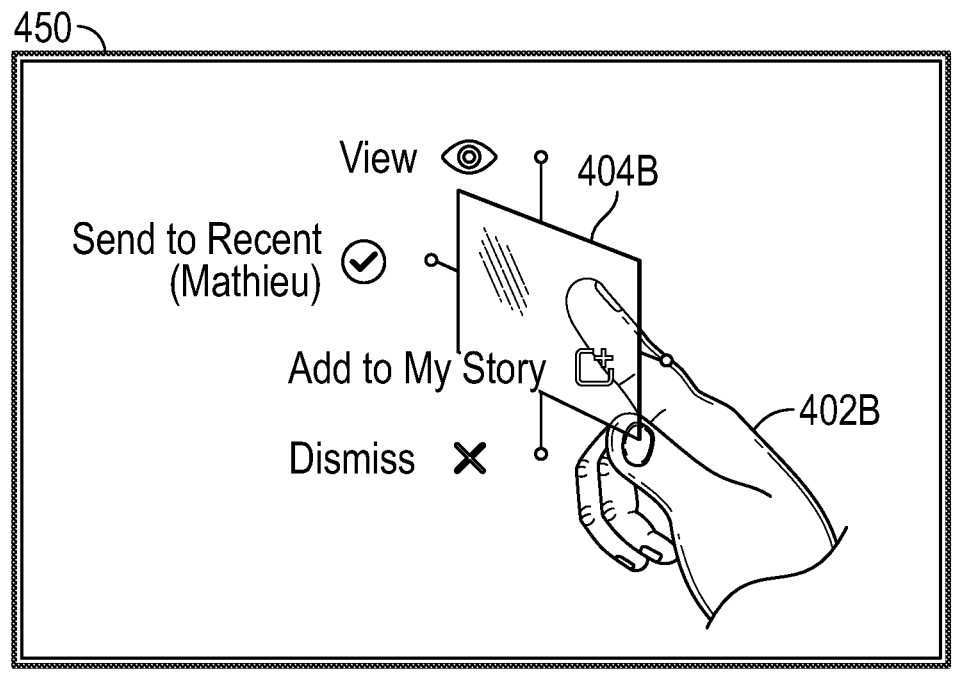
FIGS. 4C and 4D are an illustration and a schematic, respectively, showing a GUI for a right-hand interaction on a right side of the eyewear device.

FIG. 4C is an example GUI 450 presented on the display of the eyewear device 100 when a finger contacts an input surface 181 on the right side of the eyewear device 100. The GUI 450 has a right hand perspective; and depicts a virtual pointer 402B (e.g., an image of a right hand with an index finger extended) and a virtual input surface 404B. The virtual pointer 402B corresponds to the finger on the input surface 181 on the right side of the eyewear device 100, the virtual input surface 404B corresponds to the input surface on the right side of the eyewear device 100, and the relationship between the positional relationship of the virtual pointer 402B on the virtual input surface 404B corresponds the position of the finger on the input surface on the right side of the eyewear device 100. The available actions in the GUI 450 are the same as in the GUI 400 from a right hand perspective (e.g., swiping forward/right on the input surface 181 rather than forward/left results in an action to send an image to the same recipient that an immediately prior image was sent). Although depicted as having the same associated actions, the left hand GUI 400 and the right had GUI 450 may be associated with different actions.

Figure 4D:
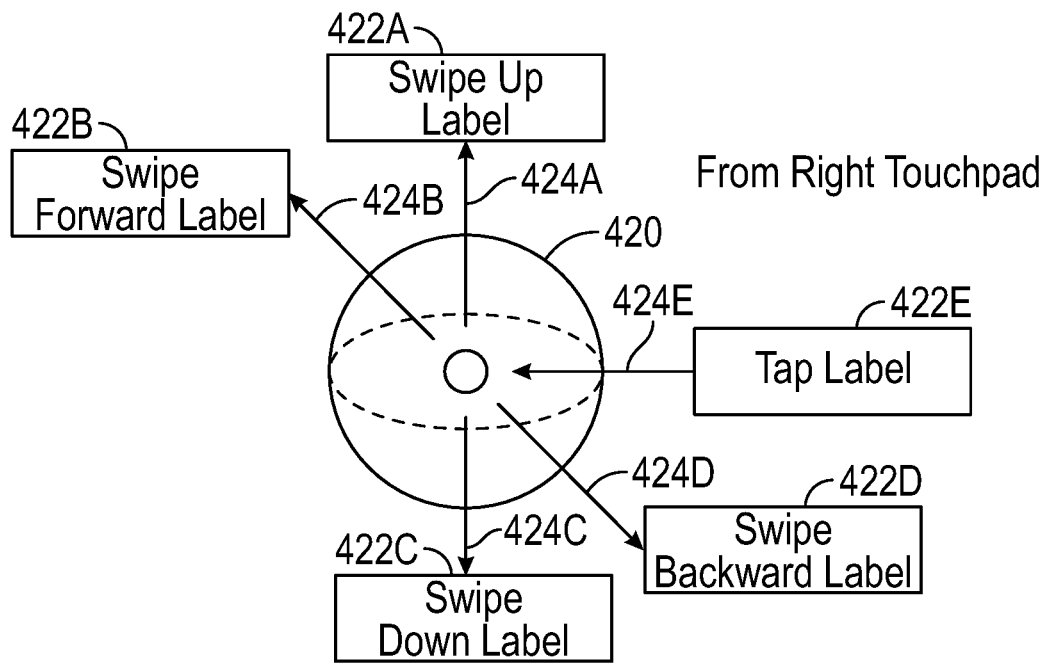

FIG. 4D depicts a template for setting up a right hand perspective GUI such as GUI 450. The template includes an orientation sphere 420. Additionally, the template includes a label 422A-E for each available tap/gesture and a corresponding directional arrow 424A-E.

FIGS. 4A-D illustrate one benefit of some of the example GUIs described herein. With the input surface 181 on the side of the eyewear, it is not intuitive in conventional GUIs designed for 2D systems what a swipe forward or a swipe backward will select. By displaying a virtual input surface 404 in 3D along with labels relatively positioned with respect to the virtual input surface and having left/right hand perspective views depending on which side of the eyewear device the user is interacting, an intuitive display is provided for quickly and easily selecting desired actions.

Figure 4E:
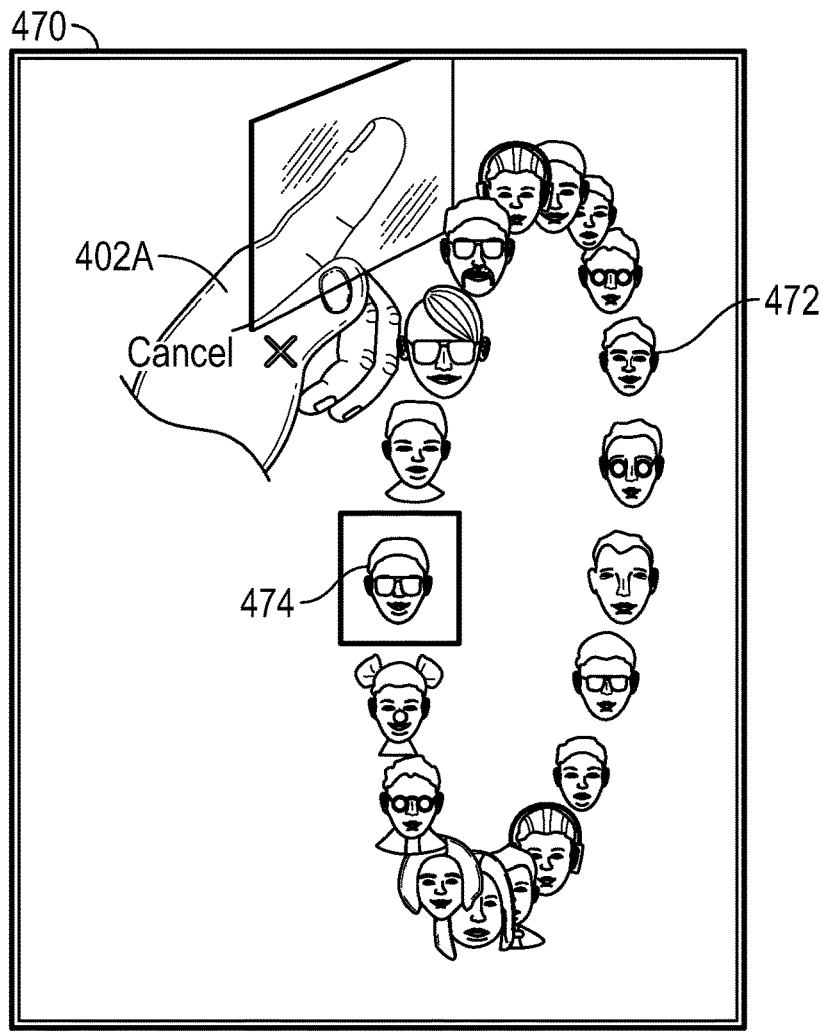
FIG. 4E is an illustration showing a GUI for a left-hand interaction on a left side of the eyewear device for selecting from many choices.

FIG. 4E depicts another GUI 470 for selecting from among multiple options. The GUI 470 includes a virtual pointer 402A and a selection ring 472. By performing a downward swipe on the input interface, a user can cause the elements of the ring (e.g., a user's friends) to rotate in a counterclockwise direction. By performing an upward swipe on the input interface, a user can cause the elements of the ring (e.g., a user's friends) to rotate in a clockwise direction. The GUI includes a selection box 474. A user can select a particular element from the ring 472 by positioning that element within the selection box 474 and tapping the input surface 181.

Figure 4F:
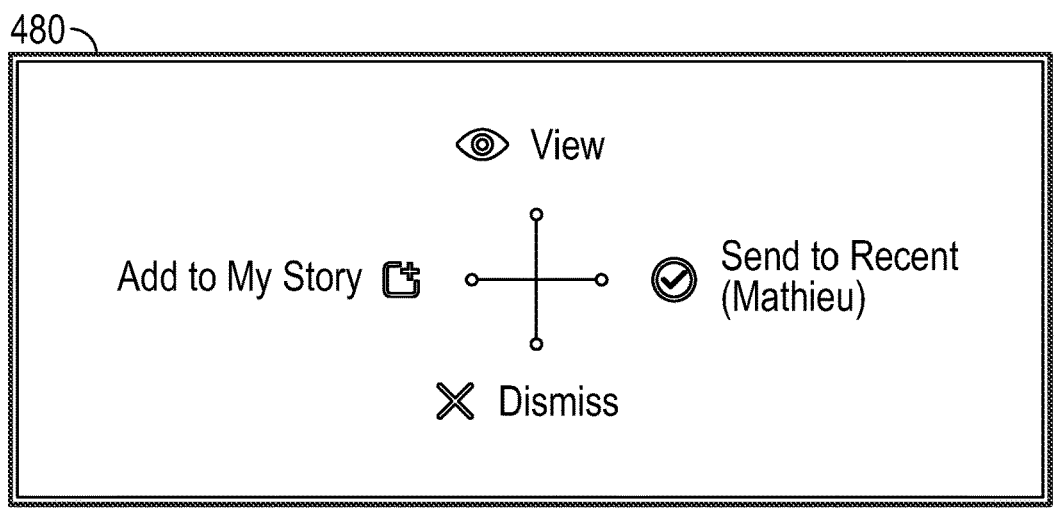
FIG. 4F is an illustration of a GUI for an accessory interaction with the eyewear device.
Figure 4G:
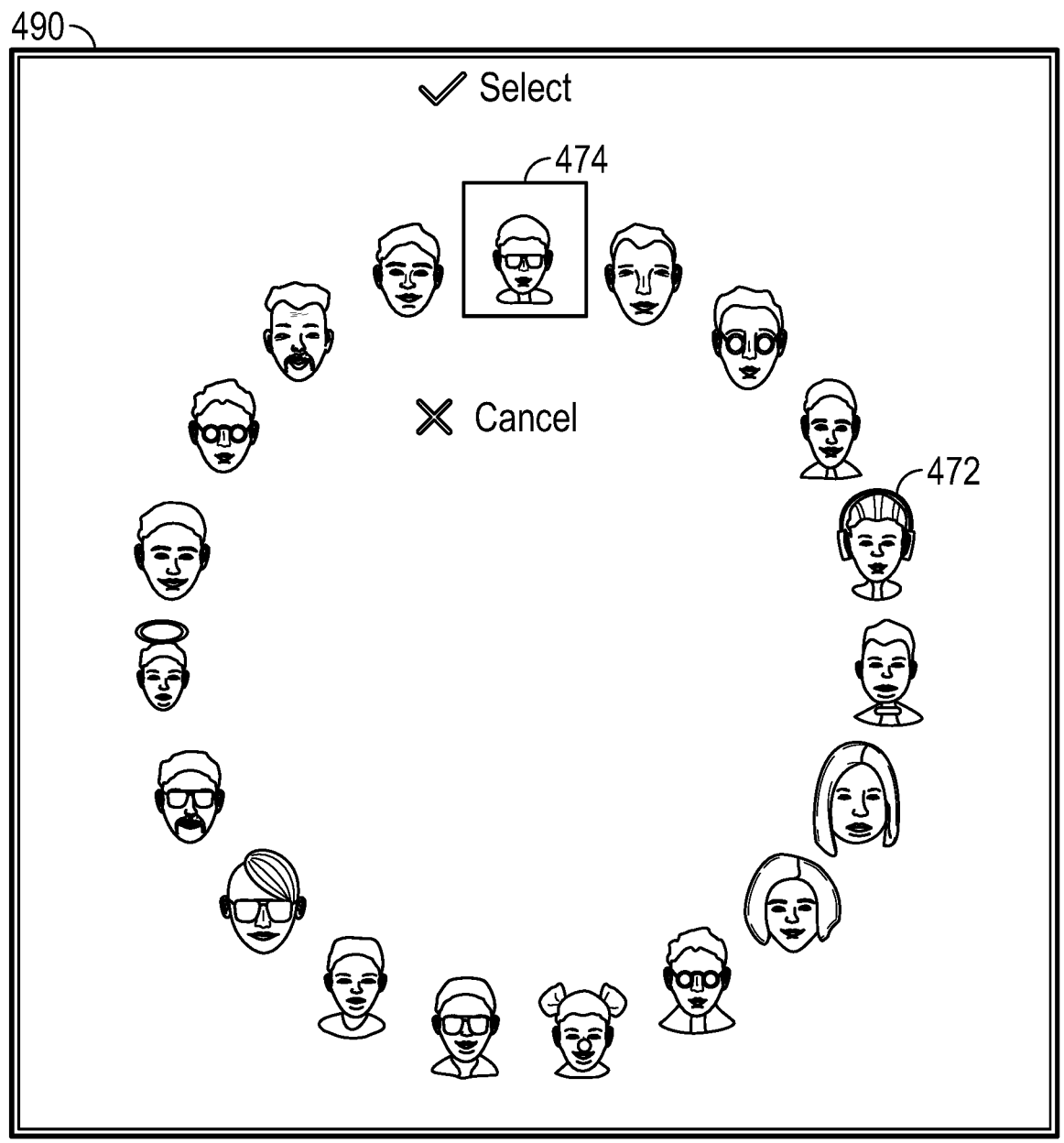
FIG. 4G is an illustration showing another GUI for an accessory interaction with the eyewear device for selecting from many choices.

FIG. 4F is another GUI 480. The GUI 480 has a straight on perspective (as opposed to a right hand or left hand perspective), e.g., for use with a remote accessory such as a depicted and described with respect to FIG. 2H. The available actions in the GUI 480 are the same as in the GUIs 400 and 450, but with a straight on perspective (e.g., swiping right on the input surface 181 rather than forward/right or forward left results in an action to send an image to the same recipient that an immediately prior image was sent). Although depicted as having the same associated actions, the GUIs 400, 450 and 480 may each be associated with different actions. FIG. 4G is another GUI 490 similar to the GUI 470 from a straight on perspective. The ring 472 in GUI 490 is circular (rather than oval as in FIG. 4E) to facilitate user perception/selection when a device such as a remote accessory that benefits from a straight on perspective is used to interface with the eyewear device 100.

Figure 5A:
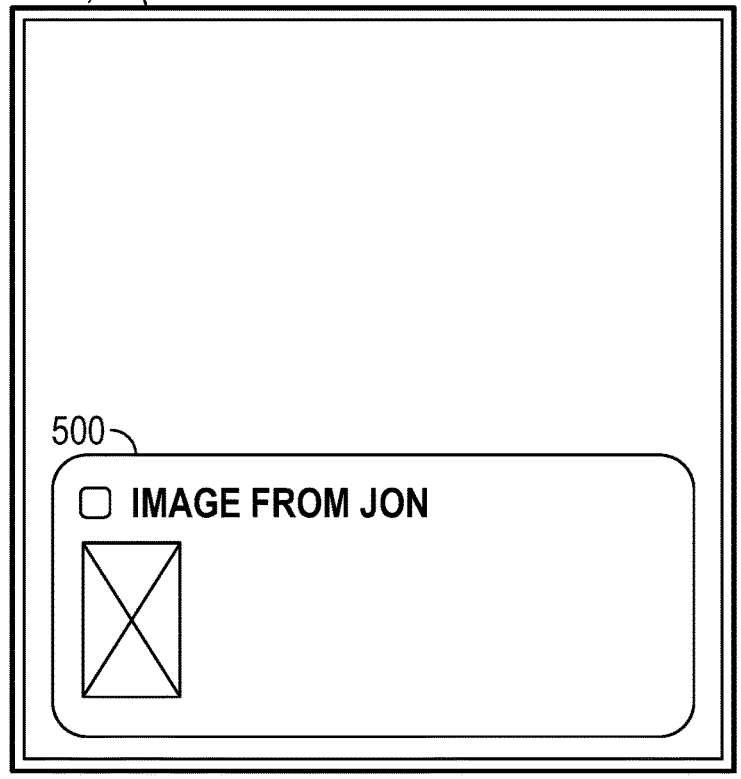
FIGS. 5A, 5B, and 5C are illustrations of a GUI interaction for images received from another user.
Figure 5B:
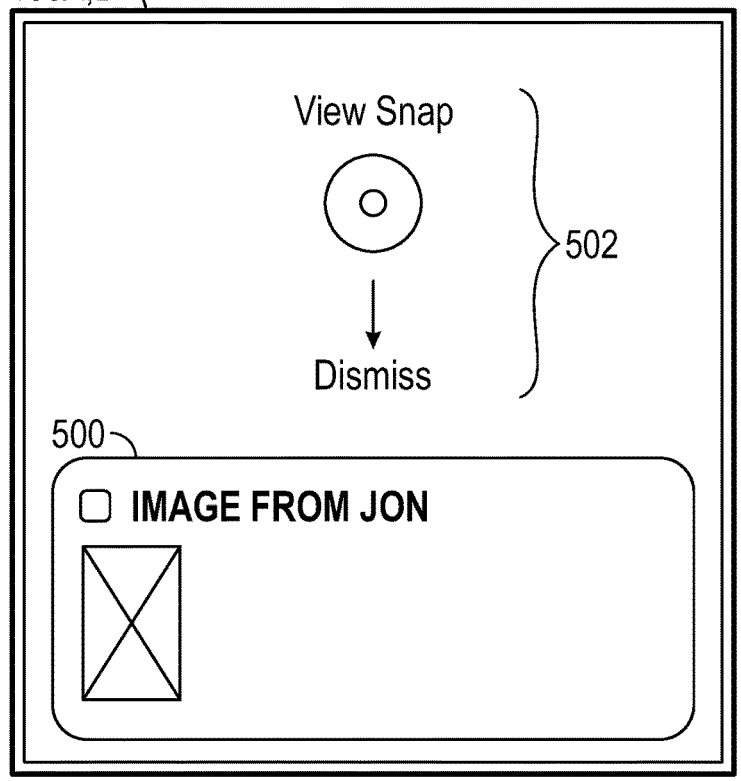
Figure 5C:
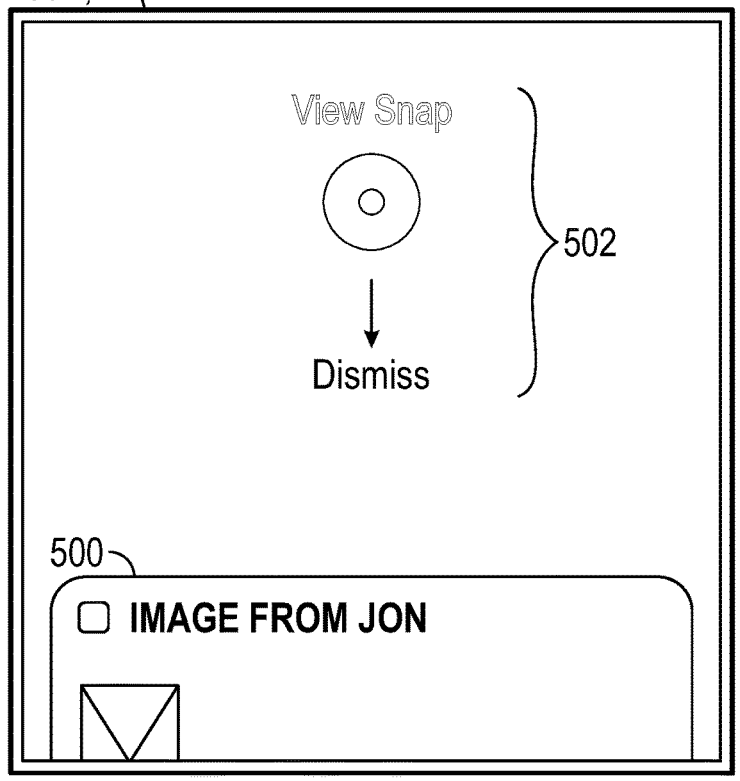

FIGS. 5A, 5B, and 5C are illustrations of a GUI interaction for images received from another user. In FIG. 5A, a notification 500 displays on the image displays 180A, B of the eyewear device 100 when an image/video message is received by the eyewear device 100 (or an associated mobile device). In FIG. 5B, a GUI 502 with available actions for interacting (e.g., "View Snap" on tap, "Dismiss Notification" on swipe down) displays on the image displays 180A, B of the eyewear device 100. In FIG. 5C, when the user swipes down, the action is confirmed by highlighting the action label taken or deemphasizing the action not being taken.

Figure 5D:
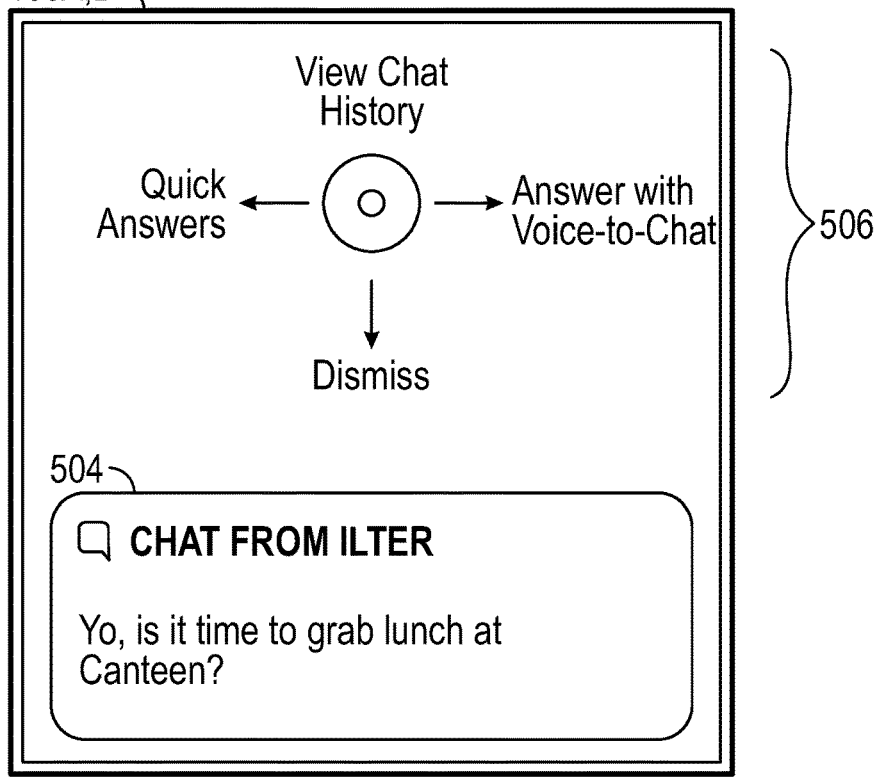
FIGS. 5D, 5E, and 5F are illustrations of a GUI interaction for receiving and responding to messages from another user.
Figure 5E:
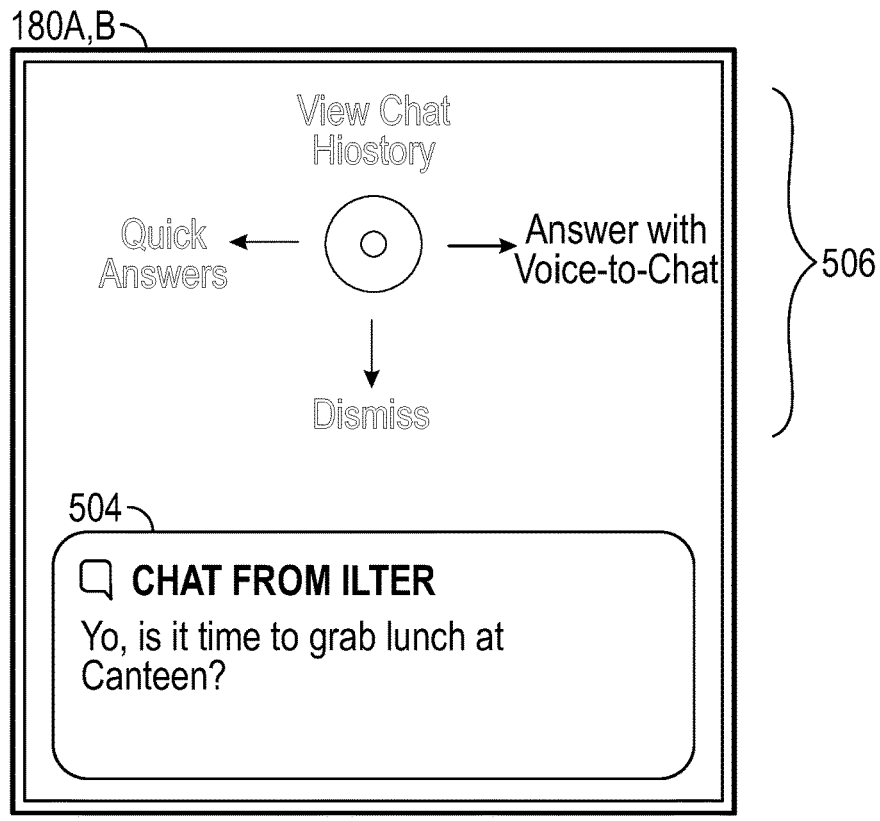
Figure 5F:
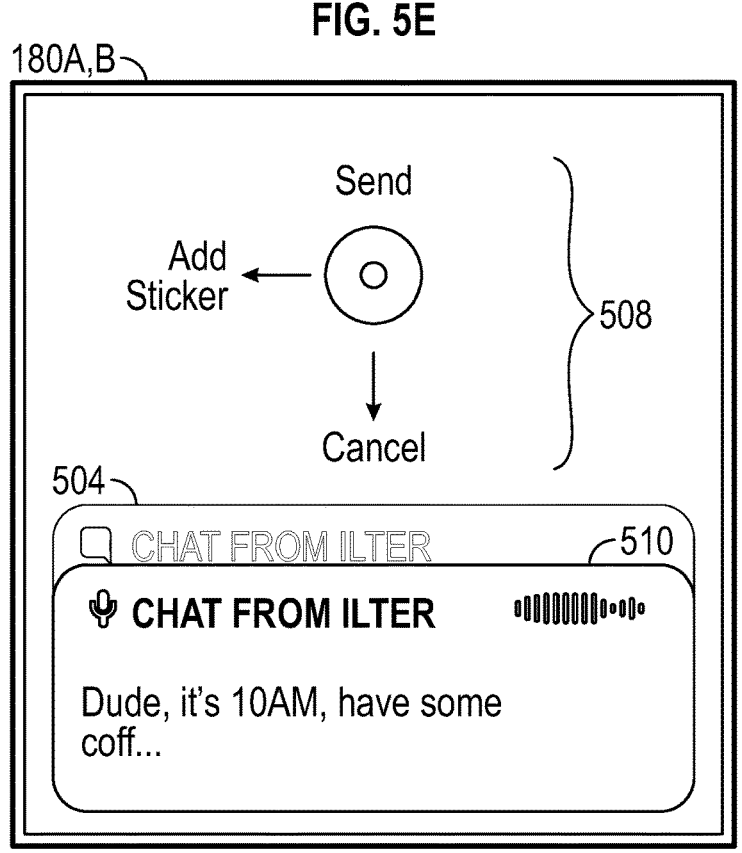

FIGS. 5D, 5E, and 5F are illustrations of a GUI interaction for receiving and responding to messages from another user. In FIG. 5D, a notification 504 displays on image displays 180A, B when a text message is received by the eyewear device 100 (or an associated mobile device). Additionally, a GUI 506 with available actions for interacting (e.g., "Answer with Voice-to-Chat" on swipe forward, "Quick Answers" selection on swipe backward, "View Chat History" on tap, and "Dismiss" on swipe down) displays. In FIG. 5E, when the user swipes forward, the action is confirmed by highlighting the action label taken and the actions not being taken are deemphasized. In FIG. 5F, a new GUI 508 displays on image displays 180A, B for use with the voice-to-chat answer selection and a response window 510 is opened.

Figure 5G:
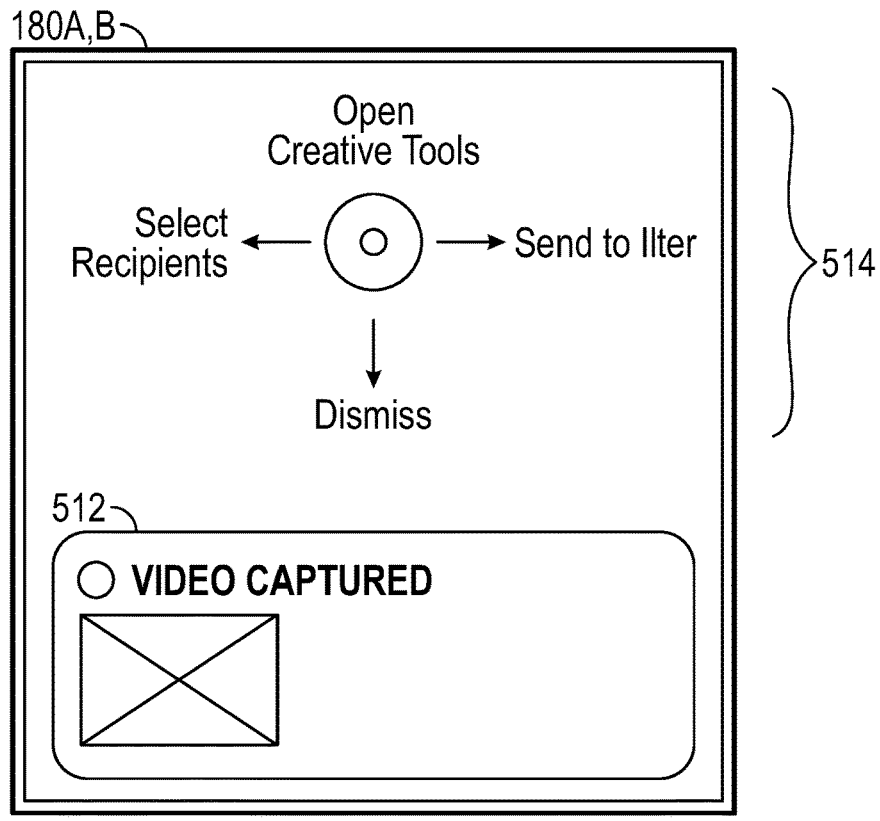
FIGS. 5G, 5H, and 5I are illustrations of a GUI interaction for sending an image/video to another user.
Figure 5H:
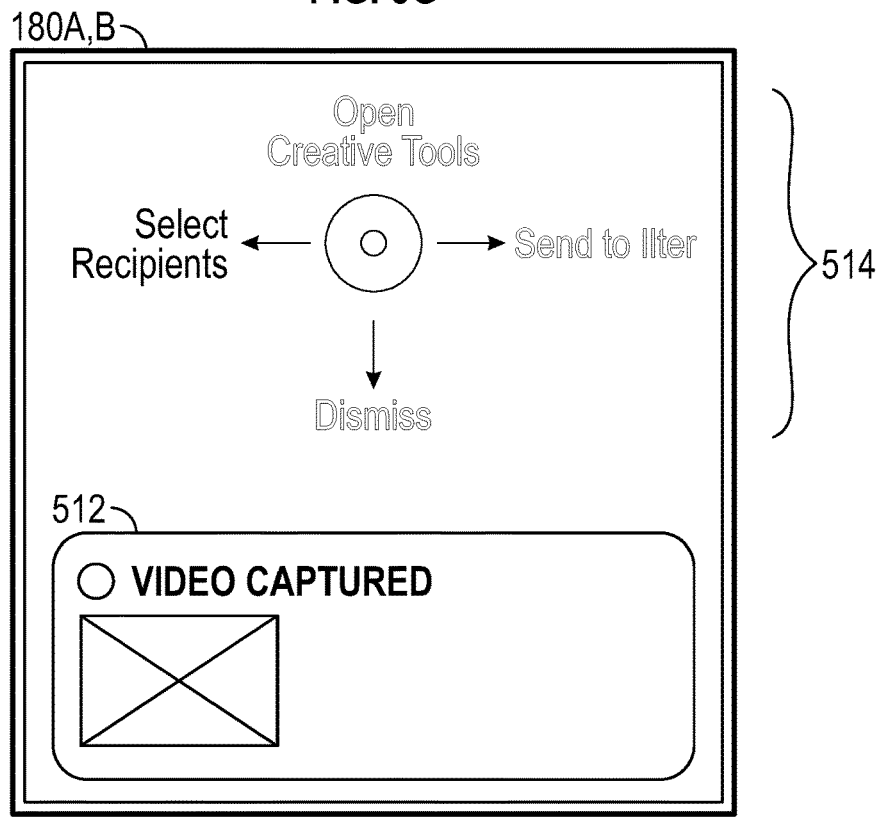
Figure 5I:
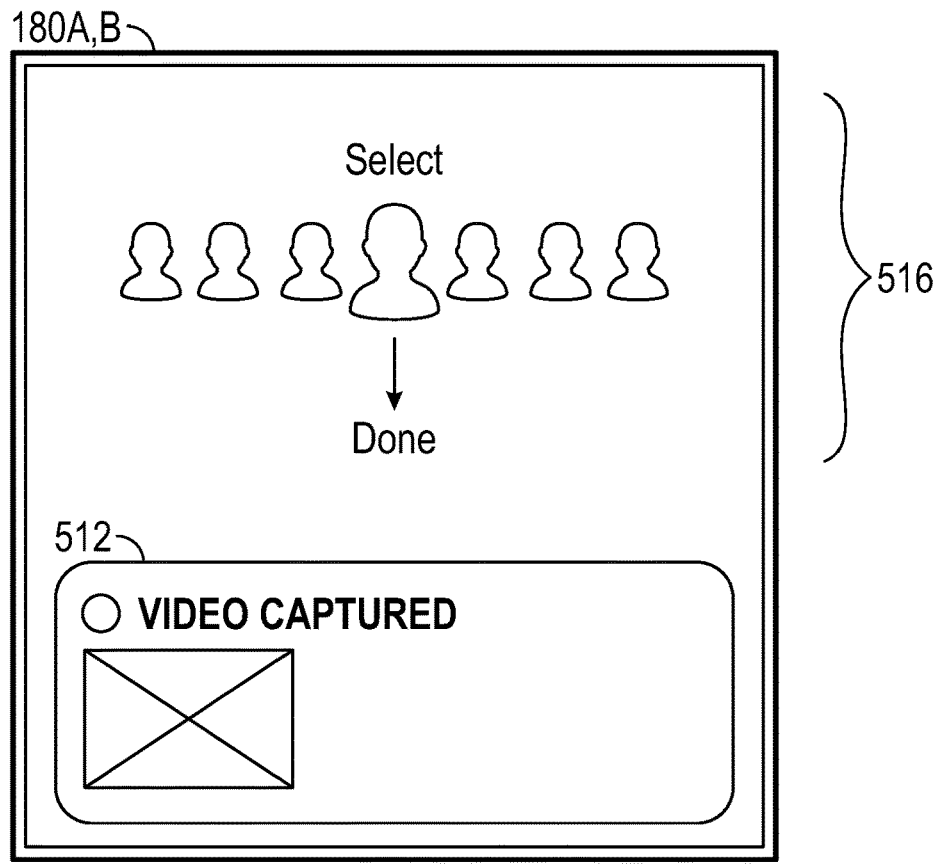

FIGS. 5G, 5H, and 5I are illustrations of a GUI interaction for sending an image/video to another user. In FIG. 5G, a notification 512 displays on image displays 180A, B when an image/video is captured by the eyewear device 100 (or an associated mobile device). Additionally, a GUI 514 with available actions for interacting (e.g., "Send to Titer" on swipe forward, "Select Recipients" selection on swipe backward, "Open Creative Tools" on tap, and "Dismiss" on swipe down) displays. In FIG. 5H, when the user swipes backward, the action is confirmed by highlighting the action label taken and the actions not being taken are deemphasized. In FIG. 5I, a new GUI 516 displays on image displays 180A, B for use with the recipient selection.

Figure 6:
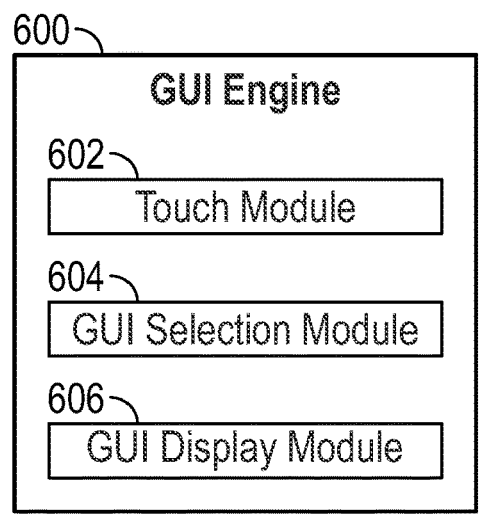
FIG. 6 is a block diagram of a GUI engine for implementing a GUI on the eyewear device.

FIG. 6 is a block diagram of a GUI engine 600 for implementing a GUI on the eyewear device 100. The GUI engine includes a touch module 602, a GUI selection module 604, and a GUI display module 606. The touch module 602 is a computer module for execution on a processor of a computer platform that receives input from input surface 181 and identified finger taps, touches, holds, slides, and swipes in response to the received input.

The GUI selection module 604 is a computer module for execution on a processor of a computer platform that identifies which GUI to display to the user. The GUI selection module 604 monitors applications running on the computer platform and selects a GUI based on notifications from the applications. For example, if a text application receives an incoming email and provides a notification, the GUI selection module 604 selects one GUI. If another application such as a camera application provides a notification that a picture was taken, the GUI selection module 604 selects another GUI. Additionally, the GUI selection module selects a GUI based on which input surface of the eyewear is being used (e.g., a left hand perspective GUI when the left input surface is pressed, a right hand perspective GUI when the right input surface is pressed, and a straight on perspective when a remote accessory is pressed.

The GUI display module 606 is a computer module for execution on a processor of a computer platform that displays the GUIs to the user on an optical assembly 180 of the eyewear device 100. The GUI display module 606 displays the selected GUIs on the image displays 180A, B. Additionally, the GUI display module transitions from one GUI to another. For example, if the user presses the left input surface and then the right input surface, the GUI display module 606 will transition from the left hand perspective GUI 400 to the right had perspective GUI 450.

Figure 7A:
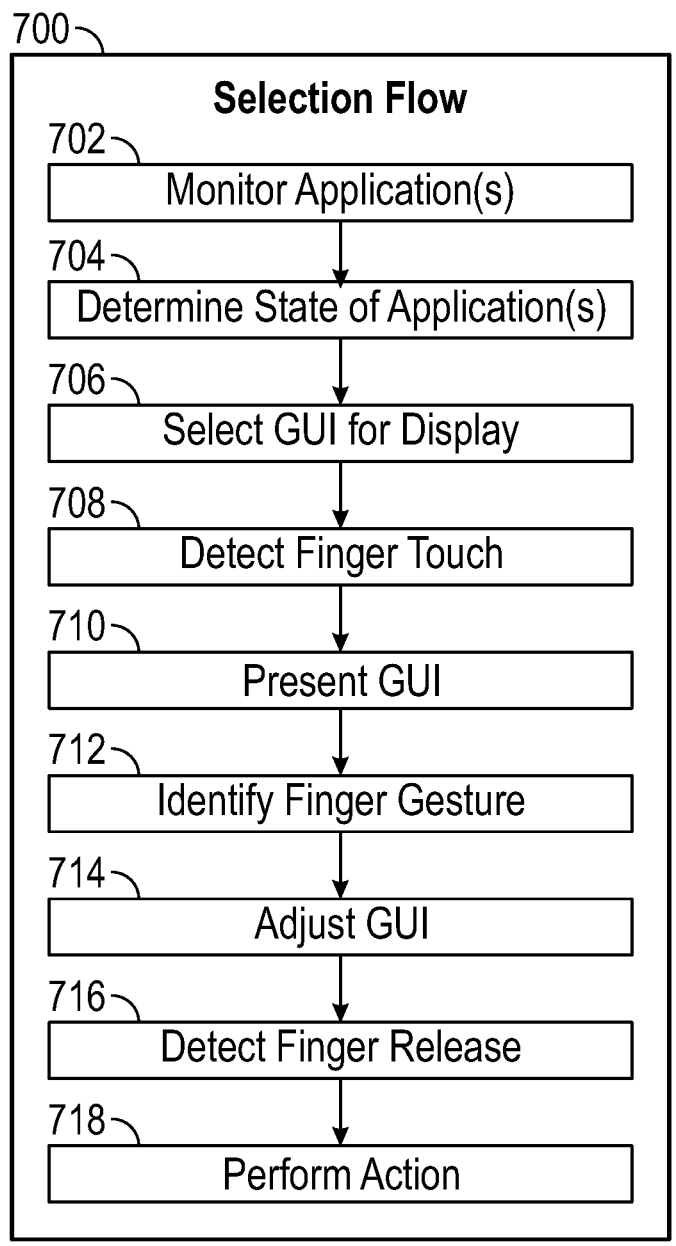
FIGS. 7A, 7B, and 7C are flow charts for implementing a GUI on the eyewear device.
Figure 7B:
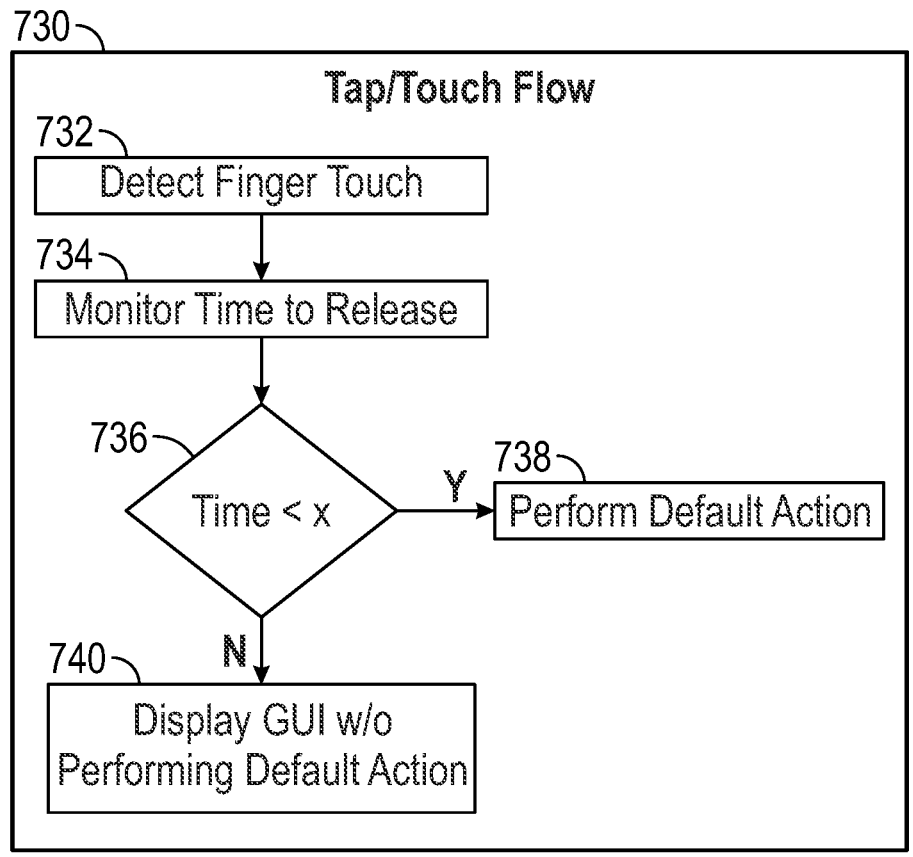
Figure 7C:
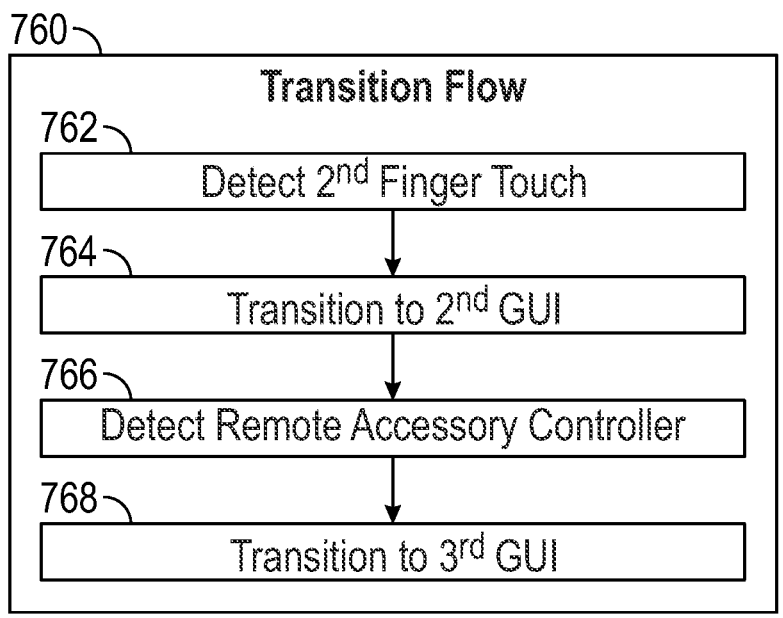

FIGS. 7A, 7B, and 7C depict flow charts for implementing a graphical user interface using the GUI engine 600. Although the steps are described with reference to the eyewear 100 described herein, other eyewear for implementing the steps of FIGS. 7A, 7B, and 7C will be understood by one of skill in the art from the description herein. Additionally, it is contemplated that one or more of the steps of FIG. 7A, 7B, or 7C may be omitted, performed simultaneously or in series, additional steps may be added, and steps may be performed in an order other than illustrated and described.

Flow chart 700 depicts steps for selecting an action using a GUI. At step 702, monitor the application(s). The GUI selection module 604 of the eyewear device 100 (e.g., processor(s) 322/332 and associated programming instructions implementing the GUI selection module 604) monitors applications running on the eyewear device (e.g., a texting app, a camera app, etc.) or an associated mobile device. At step 704, determine the state of the application(s). The GUI selection module 604 of the eyewear device 100 monitors applications for notification events (e.g., a message received by a texting app, an image captured by a camera app, etc.).

At step 706, select a GUI for display. The GUI selection module 604 of the mobile device selects a GUI. The GUI selection is based on the input surface 181, the state of the application(s), or a combination thereof. For example, a processor implementing the GUI selection module selects a left hand perspective GUI 400 when the input surface on the left hand side of the eyewear is in use, a right hand perspective GUI 450 when the input surface 181 on the right hand side of the eyewear is in use, and a straight on perspective GUI 480 when the input is from an accessory device. Additionally, different actions are available through the GUI when a text message is received by a texting app and when an image is captured by a camera app.

At step 708, detect a finger touch on the input surface/touch pad. The touch module 602 detects the finger touch based on input from the input surface 181. At step 710, present the GUI. The GUI display module 606 displays the GUI such that it becomes visible on the optical assembly 180 of the eyewear 100 when the finger is detected and remains visible until it is removed.

At step 712, identify a finger gesture on the input surface. The touch module 602 monitors the position of the finger while it is on the input surface and processes the positions to identify gestures. For example, a movement in a generally downward direction is perceived as a swipe down.

At step 714, adjust the GUI. The GUI display module 606 adjusts the GUI in response to the finger movement on the input surface. The processor implementing the GUI display module 606 may display the actual position of the finger on the input surface in a corresponding virtual position on a virtual input surface on the GUI. Additionally, as the finger is moved in a particular direction, the label associated with that direction may be highlighted to indicate that action will be selected upon removal of the finger from the input surface. At step 716, detect a finger release and, at step 718, perform the action. The touch module 602 detects the finger release based on input from the input surface and the eyewear performs the selected action associated with the identified gesture.

Flow chart 730 (FIG. 7B) depicts steps for performing actions in response to a tap or a touch. At step 732, detect a finger touch. The touch module 602 detects the finger touch based on input from the input surface. At step 734, monitor the time to release the finger. The touch module 602 starts a timer when the finger touch is detected, which runs until the finger is removed. At decision block 736, compare the monitored time to a predetermined time (e.g., 100 ms). If the time is less than the predetermined time, perform the default action in step 738 (e.g., a default action option from the GUI or another predefined action). Otherwise, display the GUI without performing the default action in step 740.

Flow chart 760 (FIG. 7C) depicts steps for transitioning from a first GUI to a second GUI. At step 762 detect a second finger touch. The touch module 602 detects the second finger touch based on input from the input surface. Assuming a first GUI (e.g., GUI 400) is currently being displayed, at step 764, transition to a second GUI (e.g., GUI 450). At step 766, detect a remote accessory controller. The touch module 602 or a separate remote detection module (not shown) detects the remote accessory controller based on a transmission from the remote accessory controller that includes control instructions. Assuming the first or the second GUI are currently being displayed, at step 768, transition to a 3rd GUI (e.g., GUI 480) associated with the accessory controller.

Figure 8:
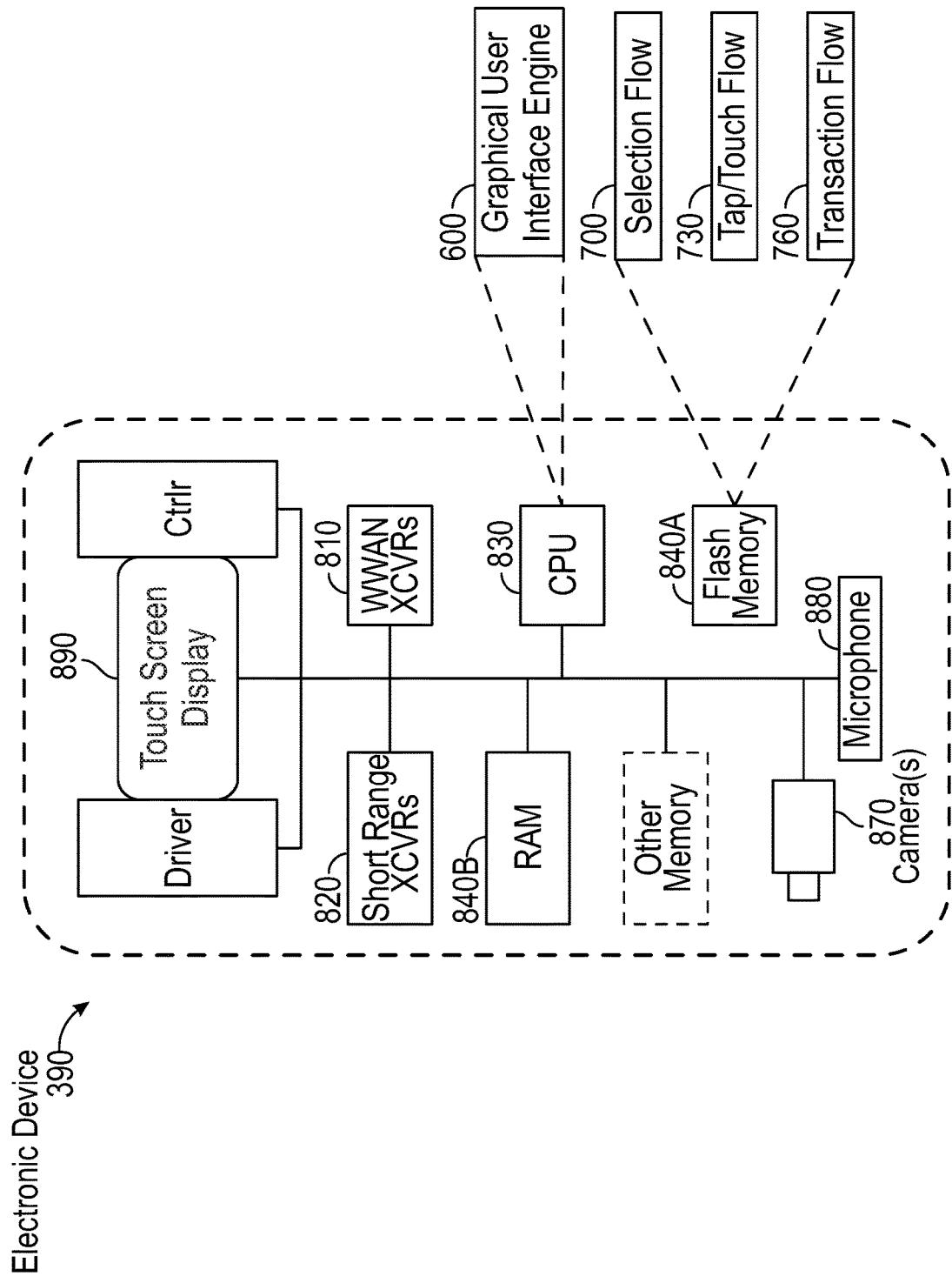
FIG. 8 is a high-level functional block diagram of a client device that communicates via a network with a server system.

FIG. 8 is a high-level functional block diagram of an example client device including a mobile device 390 that communicates via network 395 with server system 398 of FIG. 3. Shown are elements of a touch screen type mobile device 390, although other non-touch type mobile devices such as eyewear device 100 can be used. Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example, and the subject technology as described herein is not intended to be limited thereto. For purposes of this discussion, FIG. 8 therefore provides a block diagram illustration of an example mobile device 390 having an optional touch screen display 890 for displaying content and receiving user input as (or as part of) the user interface. Mobile device 390 also includes a camera(s) 870, such as visible light camera (s), and a microphone 880.

The activities that are the focus of discussions here involve creating and interfacing with graphical user interfaces. The graphical user interfaces may be implemented using a graphical user interface 600 stored in memory 840A for execution by CPU 830.

As shown in FIG. 8, the mobile device 390 includes at least one digital transceiver (XCVR) 810, shown as WWAN XCVRs, for digital wireless communications via a wide area wireless mobile communication network 395. The mobile device 390 also includes additional digital or analog transceivers, such as short range XCVRs 820 for short-range network communication, such as via NFC, VLC, DECT, ZigBee, Bluetooth™, or WiFi. For example, short range XCVRs 820 may take the form of any available two-way wireless local area network (WLAN) transceiver of a type that is compatible with one or more standard protocols of communication implemented in wireless local area networks, such as one of the Wi-Fi standards under IEEE 802.11 and 4G LTE.

To generate location coordinates for positioning of the mobile device 390, the mobile device 390 can include a global positioning system (GPS) receiver (not shown).

Alternatively, or additionally, the mobile device 390 can utilize either or both the short range XCVRs 820 and WWAN XCVRs 810 for generating location coordinates for positioning. For example, cellular network, WiFi, or Bluetooth™ based positioning systems can generate very accurate location coordinates, particularly when used in combination. Such location coordinates can be transmitted to the eyewear device over one or more network connections via XCVRs 820.

The transceivers 810, 820 (network communication interface) conforms to one or more of the various digital wireless communication standards utilized by modern mobile networks. Examples of WWAN transceivers 810 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 810, 820 provide two-way wireless communication of information including digitized audio signals, still image and video signals, web page information for display as well as web related inputs, and various types of mobile message communications to/from the mobile device 390 for user identification strategies.

Several of these types of communications through the transceivers 810, 820 and a network, as discussed previously, relate to protocols and procedures in support of communications with the server system 398 for obtaining and storing friend device capabilities. Such communications, for example, may transport packet data via the short range XCVRs 820 over the wireless connections of network 395 to and from the server system 398 as shown in FIG. 3. Such communications, for example, may also transport data utilizing IP packet data transport via the WWAN XCVRs 810 over the network (e.g., Internet) 395 shown in FIG. 3. Both WWAN XCVRs 810 and short range XCVRs 820 connect through radio frequency (RF) send-and-receive amplifiers (not shown) to an associated antenna (not shown).

The mobile device 390 further includes a microprocessor 830, shown as a CPU, sometimes referred to herein as the host controller. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 830, for example, may be based on any known or available microprocessor architecture, such as a Reduced Instruction Set Computing (RISC) using an ARM architecture, as commonly used today in mobile devices and other portable electronic devices. Of course, other processor circuitry may be used to form the CPU 830 or processor hardware in smartphone, laptop computer, and tablet.

The microprocessor 830 serves as a programmable host controller for the mobile device 390 by configuring the mobile device to perform various operations, for example, in accordance with instructions or programming executable by processor 830. For example, such operations may include various general operations of the mobile device, as well as operations related to performance metric monitoring, generating graphical user interfaces, reporting to server system 398, and gating. Although a processor may be configured by use of hardwired logic, typical processors in mobile devices are general processing circuits configured by execution of programming.

The mobile device 390 includes a memory or storage device system, for storing data and programming. In the example, the memory system may include a flash memory 840A and a random access memory (RAM) 840B. The RAM 840B serves as short term storage for instructions and data being handled by the processor 830, e.g., as a working data processing memory. The flash memory 840A typically provides longer term storage.

Hence, in the example of mobile device 390, the flash memory 840A is used to store programming or instructions for execution by the processor 830. Depending on the type of device, the mobile device 390 stores and runs a mobile operating system through which specific applications run, including applications 600, 700, 730 and 760. Examples of mobile operating systems include Google Android®, Apple iOS® (I-Phone or iPad devices), Windows Mobile®, Amazon Fire OS®, RIM BlackBerry® operating system, or the like.

Figure 9:
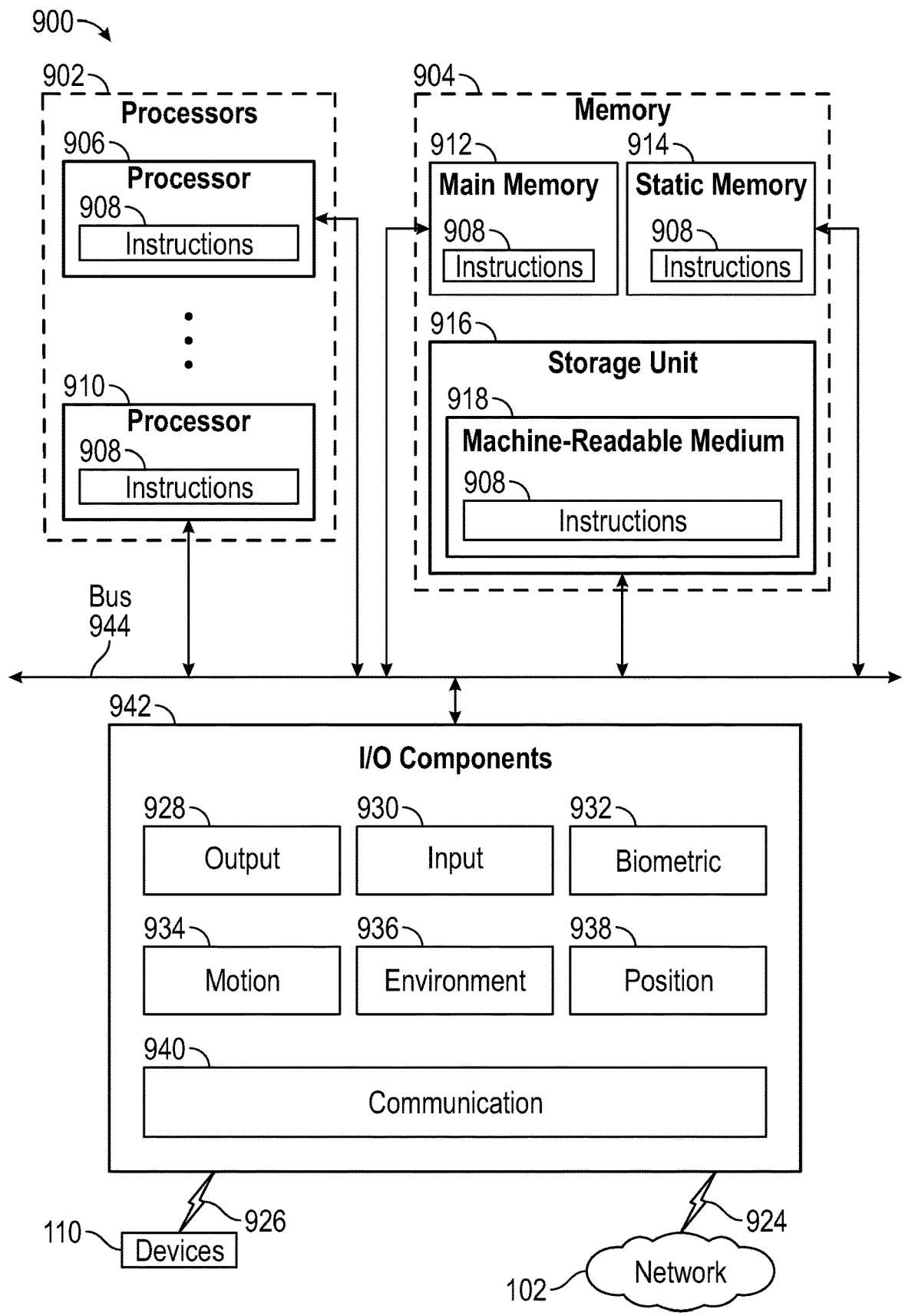
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of a machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include processors 902, memory 904, and I/O components 942, which may be configured to communicate with each other via a bus 944. In an example, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 (e.g., a non-transitory machine-readable storage medium) within the storage unit 916, within at least one of the processors 902 (e.g., within the processor's cache memory), or any suitable combination thereof, during execution thereof by the machine 900.

Furthermore, the machine-readable medium 918 is non-transitory (in other words, not having any transitory signals) in that it does not embody a propagating signal. However, labeling the machine-readable medium 918 "non-transitory" should not be construed to mean that the medium is incapable of movement; the medium should be considered as being transportable from one physical location to another. Additionally, since the machine-readable medium 918 is tangible, the medium may be a machine-readable device.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones may include a touch input device or other such input mechanisms, while a headless server machine will likely not include such a touch input device. It will be appreciated that the I/O components 942 may include many other components that are not shown in FIG. 9. In various examples, the I/O components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 930 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location, force of touches or touch gestures, or other tactile input components), audio input components (e.g., a microphone), and the like.

In further examples, the I/O components 942 may include biometric components 932, motion components 934, environmental components 936, or position components 938, among a wide array of other components. For example, the biometric components 932 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 include acceleration sensor components (e.g., accelerometer), gravitation sensor components, rotation sensor components (e.g., gyroscope), and so forth. The environmental components 936 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 further include communication components 940 operable to couple the machine 900 to network 102 and client devices 110 via a coupling 924 and a coupling 926, respectively. For example, the communication components 940 may include a network interface component or another suitable device to interface with the network 102. In further examples, the communication components 940 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 110 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geolocation, location via Wi-Fi® signal triangulation, location via detecting an NFC beacon signal that may indicate a particular location, and so forth.

The various memories (e.g., memory 904, main memory 912, static memory 914, memory of the processors 902), storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 102, using a transmission medium, via a network interface device (e.g., a network interface component included in the communication components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 110.

Figure 10:
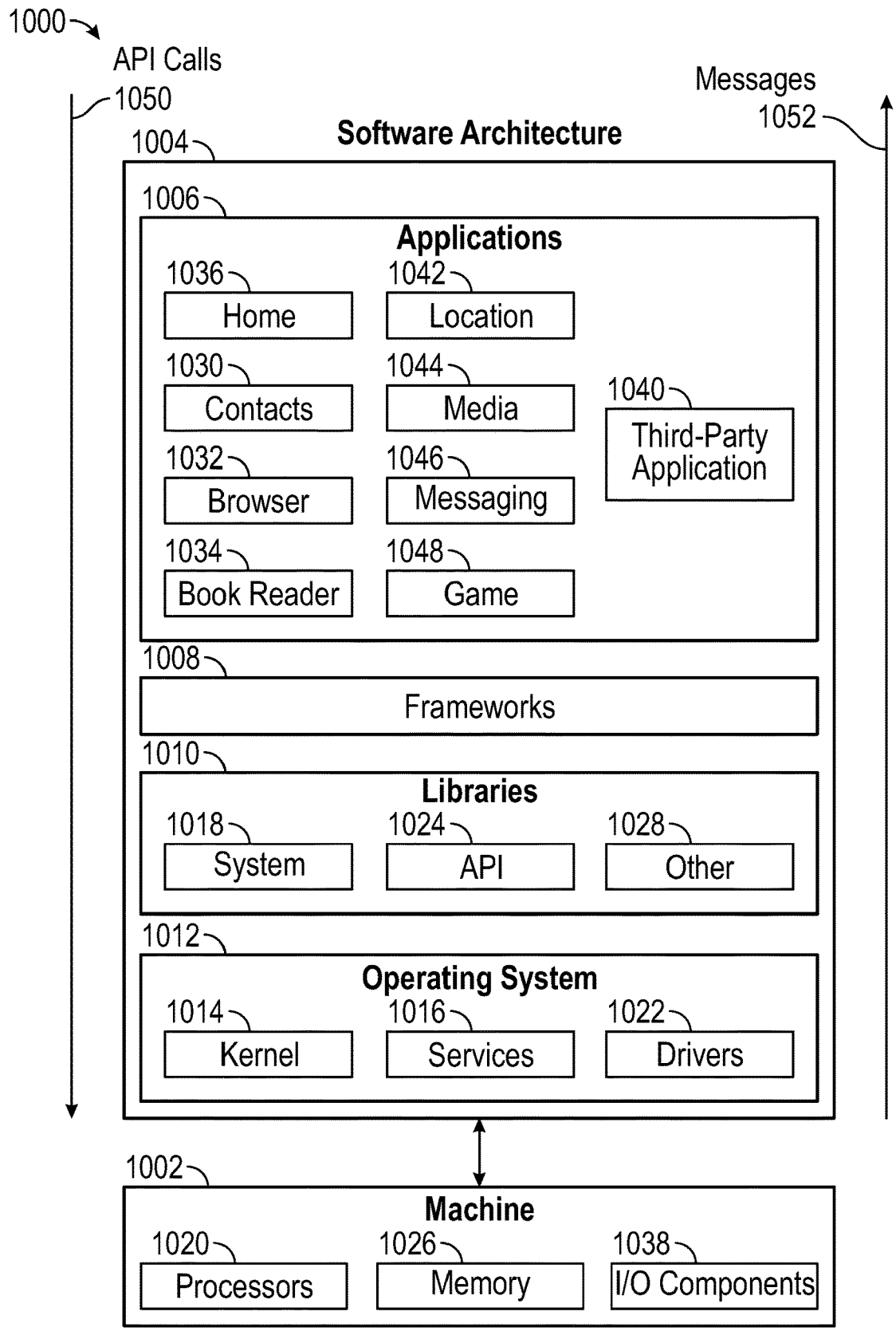
FIG. 10 is a block diagram showing a software architecture within which the present disclosure may be implemented, in accordance with examples.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1010 provide a low-level common infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a high-level common infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to produce one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

The terms and expressions used herein are understood to have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

What is claimed is:

1. A method for controlling an eyewear device of a user, the method comprising:
presenting a first graphical user interface (GUI) on an image display including available actions for responding to another user in response to a message from the another user within an application executing on the eyewear device;
detecting a first finger touch on a first input surface on one side of an eyewear device;
selecting, on the image display of the eyewear device, an available action in accordance with the detected first finger touch on the first input surface for controlling the eyewear device;
in response to selecting the available action, present a second GUI on the image display based on a first visual perspective of the first input surface;
detecting an activation signal from a remote accessory;
presenting a third GUI on the image display from a second visual perspective of the remote accessory in response to the detected activation signal from the remote accessory; and
adjusting the third GUI presented on the image display of the eyewear device in response to inputs from the remote accessory.

2. The method of claim 1, further comprising:
detecting a second finger touch on a second input surface on another side of the eyewear device; and
presenting a fourth graphical user interface (GUI) on the image display responsive to the detected second finger touch from a third visual perspective on the second input surface in response to the second finger touch on the second input surface.

3. The method of claim 2, further comprising:
presenting the first GUI or the second GUI on the image display from the first visual perspective of the first input surface in response to the first finger touch; and
transitioning to displaying the fourth GUI on the image display from the third visual perspective of the second input surface in response to the second finger touch on the second input surface.

4. The method of claim 1, further comprising:
identifying a finger gesture on the first input surface of the eyewear device by detecting at least one touch event; and
adjusting the first GUI presented on the image display of the eyewear device responsive to the identified finger gesture.

5. The method of claim 4, wherein the first GUI includes at least one symbol associated with the identified finger gesture, and the adjusting comprises highlighting the at least one symbol in response to the identified finger gesture.

6. The method of claim 1, further comprising:
monitoring the application executing on the eyewear device;
determining a current state of the monitored application;
presenting a plurality of GUIs based on the determined state of the monitored application; and
selecting the first GUI from the plurality of GUIs responsive to the determined state of the monitored application.

7. The method of claim 1, wherein the first GUI includes a plurality of selectable actions, each selectable action corresponding to one of a plurality of non-tap finger gestures, one of the selectable actions is designated as a default action, and the method further comprises:
identifying a finger tap gesture on the first input surface; and
performing the default action in response to the finger tap gesture.

8. The method of claim 7, further comprising:
identify a finger hold gesture on the first input surface; and
display the first GUI until the finger is removed from the first input surface without performing the default action.

9. The method of claim 1, wherein the detecting comprises detecting a position of the first finger touch on the first input surface and wherein the first GUI displays a first virtual input surface corresponding to the first input surface and a virtual pointer adjacent the first virtual input surface in a virtual position corresponding to the position of the first finger touch on the first input surface and positioned to correspond to the first finger touch on the first input surface.

10. An eyewear device, comprising:
a support structure;
a first input surface on a first side of the support structure;
an image display supported by the support structure and positioned to present an image to a user;
an image display driver coupled to the image display to control the image presented to the user;
a memory;
a processor coupled to the first input surface, the image display driver, and the memory; and
programming in the memory, wherein execution of the programming by the processor configures the eyewear device to perform functions, including functions to:
present a first graphical user interface (GUI) on the image display including available actions for responding to another user in response to a message from the another user within an application executing on the eyewear device;
detect a first finger touch on the first input surface;
select, on the image display, an available action in accordance with the detected first finger touch on the first input surface for controlling the eyewear device;
in response to selecting the available action, present a second GUI on the image display based on a first visual perspective of the first input surface;
detect an activation signal from a remote accessory configured for wireless communication;
present a third GUI on the image display from a second visual perspective of the remote accessory in response to the detected activation signal from the remote accessory; and
adjust the third GUI presented on the image display of the eyewear device in response to inputs from the remote accessory.

11. The eyewear device of claim 10, further comprising:
a second input surface on a second side of the support structure; and
wherein execution of the programming by the processor further configures the eyewear device to:
detect a second finger touch on the second input surface; and
present a fourth graphical user interface (GUI) on the image display responsive to the detected second finger touch from a third visual perspective on the second input surface in response to the second finger touch on the second input surface.

12. The eyewear device of claim 11, wherein the image display driver presents the image on the image display as a three-dimensional image and wherein the processor configures the eyewear device to:

present the first GUI or the second GUI on the image display from the first visual perspective of the first input surface in response to the first finger touch; and
transition to displaying the fourth GUI on the image display from the third visual perspective of the second input surface in response to the second finger touch on the second input surface.

13. The eyewear device of claim 10, wherein execution of the programming by the processor further configures the eyewear device to:
identify a finger gesture on the first input surface of the eyewear device by detecting at least one touch event; and
adjust the first GUI presented on the image display of the eyewear device responsive to the identified finger gesture.

14. The eyewear device of claim 13, wherein the first GUI includes at least one symbol associated with the identified finger gesture and wherein the at least one symbol is highlighted in response to the identified finger gesture.

15. The eyewear device of claim 10, wherein execution of the programming by the processor further configures the processor to:
monitor the application executing on the eyewear device;
determine a current state of the monitored application;
present a plurality of GUIs based on the determined state of the monitored application; and
select the first GUI from the plurality of GUIs responsive to the determined state of the monitored application.

16. The eyewear device of claim 10, wherein the first GUI includes a plurality of selectable actions, each selectable action corresponding to one of a plurality of non-tap finger gestures, one of the selectable actions is designated as a default action, and the processor is further configured to:
identify a finger tap gesture on the first input surface; and
perform the default action in response to the finger tap gesture.

17. The eyewear device of claim 16, wherein execution of the programming by the processor further configures the eyewear device to:
identify a finger hold gesture on the first input surface; and
display the first GUI until the finger is removed from the first input surface without performing the default action.

18. A non-transitory computer-readable medium storing program code which, when executed, is operative to cause at least one electronic processor of an eyewear device of a user to perform the steps of:
presenting a first graphical user interface (GUI) on an image display including available actions for responding to another user in response to a message from the another user within an application executing on the eyewear device;
detecting a first finger touch on a first input surface on one side of an eyewear device;
selecting, on the image display of the eyewear device, an available action in accordance with the detected first finger touch on the first input surface for controlling the eyewear device;
in response to selecting the available action, present a second GUI on the image display based on a first visual perspective of the first input surface;
detecting an activation signal from a remote accessory;
presenting a third GUI on the image display from a second visual perspective of the remote accessory in response to the detected activation signal from the remote accessory; and
adjusting the third GUI presented on the image display of the eyewear device in response to inputs from the remote accessory.

19. The non-transitory computer-readable medium of claim 18, further storing additional program code which, when executed, is operative to cause the at least one electronic processor of the eyewear device to perform the additional steps of:
detecting a second finger touch on a second input surface on another side of the eyewear device; and
presenting a fourth graphical user interface (GUI) on the image display responsive to the detected second finger touch from a third visual perspective on the second input surface in response to the second finger touch on the second input surface.

20. The non-transitory computer-readable medium of claim 19, wherein the additional program code, when executed, is operative to cause the at least one electronic processor of the eyewear device to perform the additional steps of:
presenting the first GUI or the second GUI on the image display from the first visual perspective of the first input surface in response to the first finger touch; and
transitioning to displaying the fourth GUI on the image display from the third visual perspective of the second input surface in response to the second finger touch on the second input surface.

* * * * *